United States Patent [19]

Burke, Jr.

[11] 3,879,326

[45] Apr. 22, 1975

[54] PREPARATION OF LATEX FROM AQUEOUS EMULSION OF SOLVENT/POLYMER SOLUTION

[75] Inventor: Oliver W. Burke, Jr., Ft. Lauderdale, Fla.

[73] Assignee: Exxon Research and Engineering Company, Linden, N.J.

[22] Filed: Sept. 2, 1971

[21] Appl. No.: 177,460

Related U.S. Application Data

[60] Division of Ser. No. 767,790, Oct. 15, 1968, Pat. No. 3,622,127, which is a continuation-in-part of Ser. Nos. 621,997, March 7, 1967, Pat. No. 3,503,917, and Ser. No. 691,823, Dec. 19, 1967, abandoned.

[52] U.S. Cl. .................... 260/29.6 R; 204/159.22; 260/29.6 XA; 260/29.6 T; 260/29.6 H; 260/29.6 AN; 260/29.6 HN; 260/29.6 F; 260/29.6 MN; 260/29.6 MP; 260/29.6 MQ; 260/29.7 R; 260/29.1 T; 160/29.7 H; 260/819

[51] Int. Cl. .......................................... C08f 45/24

[58] Field of Search........... 260/29.6 RB, 29.6 EM, 260/29.6 CM, 29.6 PT, 29.6 PM, 29.6 XA, 29.7 B, 29.7 EM

[56] References Cited

UNITED STATES PATENTS

| | | | |
|---|---|---|---|
| 3,277,037 | 10/1966 | Halper et al. | 260/29.6 XA |
| 3,437,624 | 4/1969 | Dawn et al. | 260/29.2 TN |

FOREIGN PATENTS OR APPLICATIONS

| | | | |
|---|---|---|---|
| 951,166 | 3/1964 | United Kingdom | 260/29.7 B |

*Primary Examiner*—Harold D. Anderson
*Attorney, Agent, or Firm*—Hall & Houghton

[57] ABSTRACT

The preparation of aqueous latices from solvent dispersions of elastomers and other high polymer compositions has presented problems including excessive viscosity during processing and foaming and coagulation, which have produced losses and increased costs. Herein combinations of steps are disclosed which reduce or eliminate various of these problems; enable the preparation of latices from high solids, high viscosity cements as well as from high solids cements of low molecular weight polymer; enable preparation of latices of grafted or filler extended or filler reinforced elastomers; enable preparation of latices of low molecular weight polymer which are then modified to materially increase the molecular weight of the polymer and/or the latex particle size; and enable the preparation of improved latices both dilute and of high solids contents, which are useful for example for adhesive and film forming purposes. The process in common with that of related copending applications is characterized, inter alia, by the establishment of a flow of latex through the separating zone and the impingement on said flow of the coalesced latex droplets from the solvent vapor stream in which they are delivered to the separator, and in certain embodiments by the use of particular additive materials. New combinations of steps and of apparatus for performing the same are also disclosed and claimed. The part of the process herein claimed is concerned with the preparation of a latex from an emulsion of solvent/polymer solution of precursor latex particle size, by converting the emulsion into an aerosol with the aid of steam, separating the resulting latex phase from the gaseous phase of the aerosol, adding selected monomer material and pre-radical polymerization catalyst to the latex phase, flowing the combination through a constriction at a pressure in the range of 1,000 to 10,000 p.s.i., and subjecting the combination to temperatures to polymerize the monomer material without de-stabilizing the latex. The process disclosed is applicable to the production of latices from specified rubbery and non-rubbery polymer compositions, and certain of such latices are new and useful products also claimed herein.

3 Claims, 6 Drawing Figures

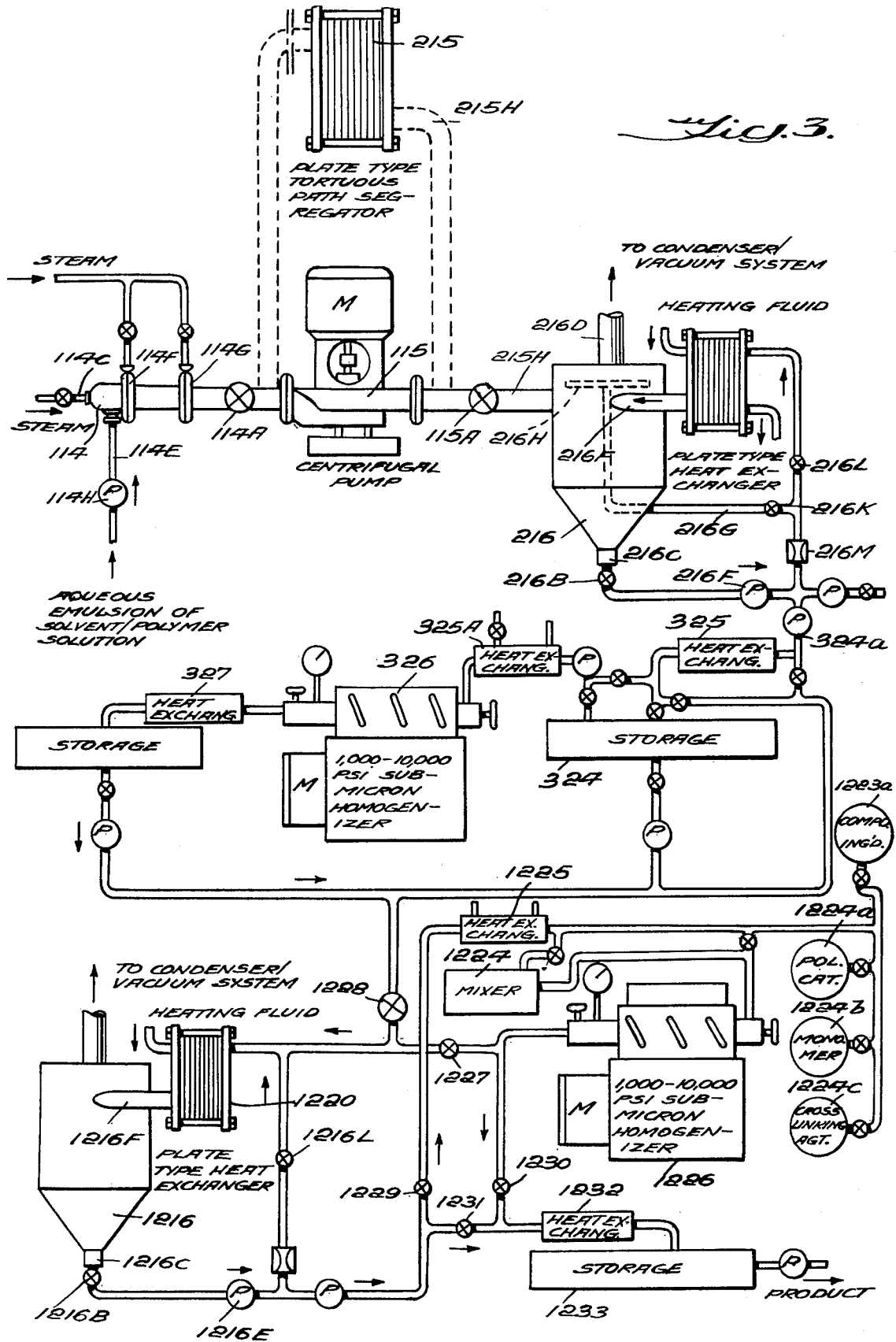

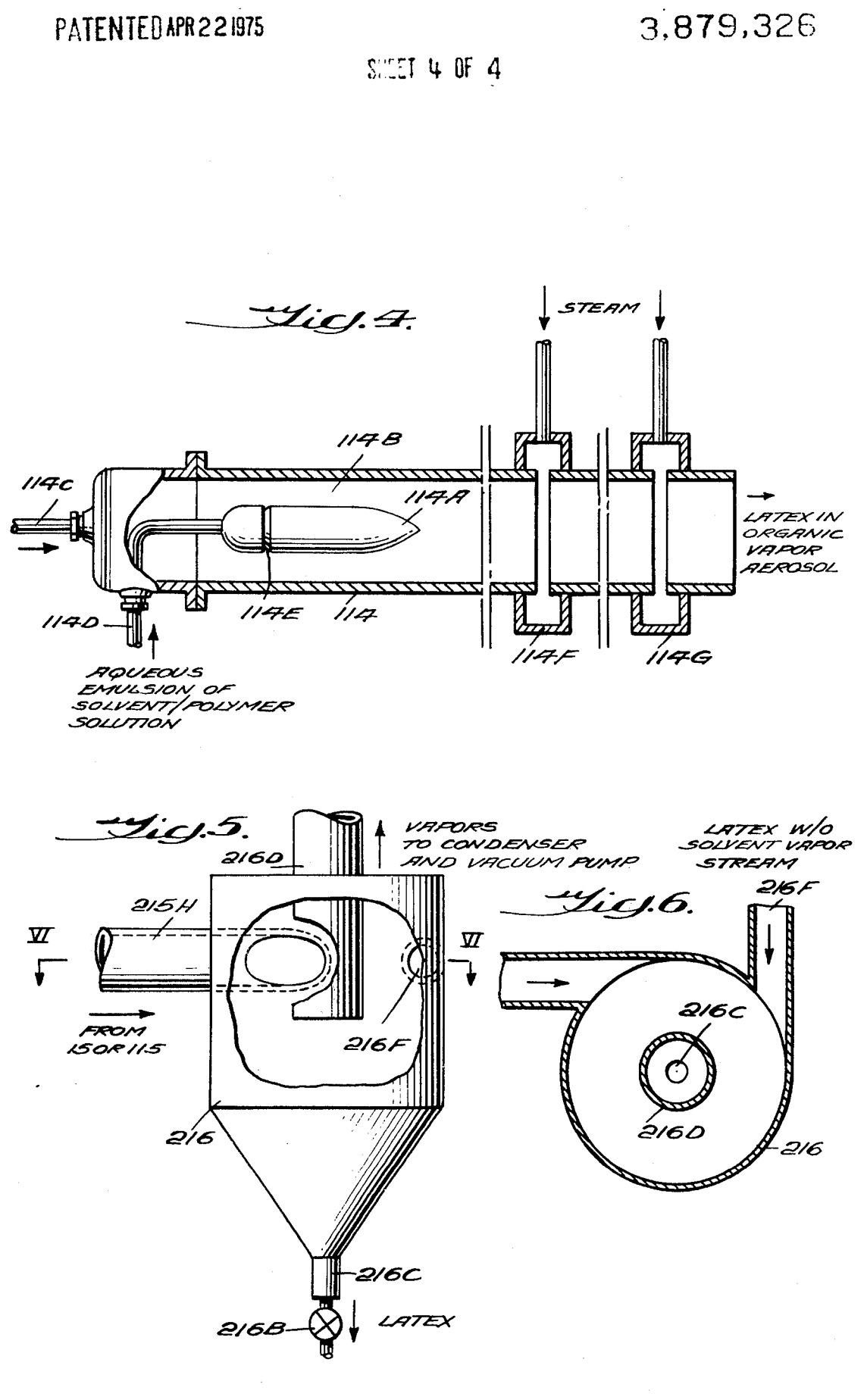

PREPARATION OF LATEX FROM AQUEOUS EMULSION OF SOLVENT/POLYMER SOLUTION

CROSS REFERENCE TO RELATED APPLICATION

This application is a division of my application Ser. No. 767,790 filed Oct. 15, 1968 (now U.S. Pat. No. 3,622,127) entered therein, said application Ser. No. 767,790 having been a continuation-in-part of may applications Ser. No. 621,997, filed March 7, 1967, (now U.S. Pat. No. 3,503,917 issued Mar. 31, 1970) and Ser. No. 691,823, filed Dec. 19, 1967 now abandoned.

BACKGROUND OF THE INVENTION

1. Field of the Invention

This invention relates to the production of aqueous latices from solvent dispersions of high polymer compositions and aims generally to provide improved process and apparatus combinations therefor, and new products produced thereby.

2. Description of the Prior Art

To date, in the practical art, synthetic latices of high polymers have been primarily prepared by emulsion polymerization, and such practice has not been applicable to high polymers made by essentially anhydrous catalyst polymerizations. It has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alia, in that (1) solvent dispersions or cements of the high polymer materials, unless quite dilute, have high viscosities, which have rendered it impractical to produce raw emulsion particles of precursor latex particle size from such dispersions when their viscosities have been over 3,000 to 10,000 centipoises; and when dilute, require the use of undesirably high quantities of emulsifier and the stripping of undesirably large quantities of solvent; (2) in that the emulsions have tended to foam excessively during stripping; (3) in that the emulsions have tended to form coagulum by drying out especially on contact with heated surfaces, during the stripping and/or concentrating processes; and (4) in that all of these problems are accentuated as the aqueous content of the emulsion is reduced.

SUMMARY OF THE INVENTION

When the molecular weight of a polymer is high, in order to form cements without excessive viscosity, which prevents emulsification of the cement, it is necessary to prepare the cements with low polymer and high solvent content. When these dilute cements are emulsified and then stripped of their high solvent content, the resulting latex contains an excess of emulsifier and its latex particles are very small. The excess of emulsifier is undesirable in many uses, e.g., in the use of the latex for producing latex foam. And when the average particle size of the latex is low, e.g., about 500 A, then the viscosity of the latex rises rapidly with increase in solids content reaching 3,000 centipoises at about 40 percent solids. It is usually the desire of the industrial users of polymer latex that the polymer be of high molecular weight, that the solids content be high, i.e., in the range of 60–70 percent, that the viscosity of the latex be low (e.g., not more than 5,000 centipoises for adhesives, and as low as 1,000 centipoises for the production of latex foam products), and that the content of emulsifier be low. In various embodiments of the present invention, singly and in cooperating combinations, provisions are made for attaining certain of the above desiderata, namely: (1) by providing processes for obtaining high molecular weight latices from cements of low molecular weight polymers with consequent savings of solvent, emulsifier and energy costs; (2) by providing processes for improving the efficiency of the cement emusifying operation with consequent improvement in particle size (e.g., by improving the average size of the cement particles and/or reducing the particle size distribution thereof, which cooperates with later steps in obtaining the above objectives; (3) by providing processes for stripping the solvent from the dispersed particles of the emulsion in the form of an aerosol as hereinafter defined with improved control of temperature and rate of vaporization and consequent reduction in materials losses, e.g., by coagulum formation; (4) by providing processes for improving the segregation and separation of the stripped latex from the solvent/vapor phase of the aerosol with consequent reduction or avoidance of coagulum losses and foaming; (5) by providing processes for increasing the molecular weight and/or adding polarity to and/or augmenting the particle size of the dispersed phase of the latex, and/or increasing the solids content and/or reducing the viscosity of the latex.

In accomplishing the aforesaid objects, in respective embodiments of the present invention conditions are created combinations of which alleviate the aforesaid problems and render practical the production of desirable aqueous latices from solvent dispersions of polymer compositions. These conditions, inter alia, include, severally and in cooperating combinations:

1. The use of particular solvents for the polymers which are essentially immiscible with water in liquid phase, and which have boiling points less than the boiling point of water at atmospheric pressure, or which form azeotropes with water which have boiling points less than the boiling point of water at atmospheric pressure, and preferably solvents which have boiling points higher than that of water but which form azeotropes with water that have boiling points lower than that of water, which preferred group comprises especially the aromatic solvents including toluene, the xylenes, ethyl benzene, cumene, etc, these solvents for the polymers being organic solvents which dissolve the polymer without any change of chemcial composition thereof.

2. The formation of relatively high solids cements of lows, intermediate, or high molecular weight polymer compositions with the solvent therefor selected as aforesaid, which in particular embodiments of the invention may have viscosities of over 1,000 centipoises preferably over 3,000 centipoises, and enven higher, which viscosities can be maintained within limits and/or be tolerated because of other cooperating steps of the process.

3. The empolyment of ultradispersing equipment, in certain embodiments together with a homogenizer which forces the aqueous emulsion at a high pressure of 1,000 to 10,000 p.s.i. through a constriction, to reduce the preferred cements in the presence of the aqueous phase and emulsifier to particles of precursor latex size preferably of sizes producing a latex of relatively narrow particle size distribution, and preferably one of an average size in the upper part of the colloidal size range; such ultra-dispersing system combining mechanical, hydraulic, and ultrasonic shear, impact, and vibrating phenomena, which applicant has shown to effect such reduction notwithstanding that such cements may have very high viscosities of up to 3,000 to 10,000 centipoises or higher, and notwithstanding that such cements may have their viscosities increased by the incorporation of fillers so that they will be contained within the precursor latex particles themselves for producing better reinforcement, as is contemplated in certain embodiments of the present invention; and such high pressure homogenizer preferably being of the resiliently restricted orifice type. The said conditions thus enable the quantities of emulsifier and solvent to be kept relatively low while simultaneously providing precursor latex size particles facilitating the removal of solvent therefrom to yield polymer particles of colloidal, i.e., latex, size.

4. The employment in the process of an emulsifier system which will form a stable aqueous emulsion of the solvent/polymer solution (principally solvent) and which will also form a stable emulsion, and finally a stable latex, of the polymer itself.

5. The removal of solvent from tiny droplets of the so formed oil-in-water emulsion by introduicng the same, as a discontinuous phase, into a flow of gas comprising essentially steam as an intital continuous pahse, while subjecting the two pahses together to a decrease of pressure and while maintaining the temperature of both pahses within the limited range for stability of the emulsion. Solvent is thus vaporized from the precursor latex sized particles while maintaining their stability, so that substantially all the solvent is vaporized into the gaseous continuous phase which thus becomes a gaseous stream carrying aqueous droplets having one or more latex size polymer particles per droplet, the preferred droplet size range being that of an aerosol of which the dispersed pahse may comprise colloidal and larger sized droplets in a steam/solvent vapor continuum.

6. The separation of the resulting droplets of latex from the gaseous continuous pahse by coalescencing and collecting the same while avoiding deleterious agglomeration and foaming. The coalescing step may be practiced in several ways which are quite distinct. One of these procedures employs centrifugal force, which may be number of times the force of gravity, to aid the coalescence or segregation of the latex without foaming. A particular embodiment of this species subjects both the latex phase and the gaseous phase to centrifugal force under controlled pressure conditions, as in a centrifugal pump delivering from a region of higher pressure to a region of lower pressure. Another procedure passes the two phases turbulently or tortuously through means defining an eleongated path to effect the coalescence or segregation into droplets large enough to be separated from the gaseous phase as hereinafter described. After the coalescence or segregation of the liquid phase in one of these manners, the two phases are passed to a collecting means, preferably of the cyclone separator type, and the gaseous phase is then passed to a condensing system from which non-condensibles are pumped by any suitable vacuum pumping means. Throughout the stripping, coalescing gand collecting steps: (a) the temperature of the two phases is maintained within the limited temperature range for stability of the emulsion, preferably by controlling the initial continuous phase in temrperature essentially to not exceed the limiting temperature for stability of the emulsion and in quantity to be sufficient to substantially effect the stripping of the solvent, and by controlling the temperature and quantity of the emulsion being dispersed therein; (b) the delivery of substantially all of the solvent to the gaseous continuous phase is essentially effected preferably in a single pass by appropriate design of the capacity of the apparatus, but when it is desired to employ apparatus of more limited capacity, is achieved in part in a first pass through the stripping apparatus and is completed by an additional pass or passes of the partially stripped material through the same equipment, i.e., by a recycle, and (c) the flow of gas comprising steam as the initial continuum preferably consists entirely of steam expanded, when it first contacts the emulsion, to sub-atmospheric pressure and to a temperature not detrimental to the latter, where any substantial quantity of solvent is being stripped from the precursor latex sized particles, but, under conditions where it is desired to augment the volume or velocity of the initial continuum, being augmentable by including a minor proportion of non-condensible gas or of the solvent in the said flow of gas, for which purpose a minor proportion of the effluent gas phase from the separator, or of the azeotrope remaining in said gas phase after condenstation of unazeotroped water vapor therefrom, may be recycled to constitute a part of the intial continuum, or in particluar embodiments, by the introduction of only a part of the steam at the point at which the emulsion is injected, and augmenting the flow and solvent vaporation by the introduction of further steam downstream from the point of emulsion introduction.

7. The latex delivered by the separator is a stable latex suitable for any use for which its solids content adapts it. It is also at a temperature within the limited range for stability of the emulsion and the invention further contemplates that this separated latex, preferably without cooling, may be recycled and be again passed through the centrifugal segregator or the elongated path segregator, or recycled only through the heat exchanger if desired, and particularly to concentrate the latex by removing water therefrom, when a product of higher solids content is desired. When concentrating stripped latex it is desirable to cut off the supply of initial raw emulsion and the steam and to supply the external heat to the latex through the walls defining the elongated path, e.g., a plate heat exchanger to vaproize water from the latex with the aid of reduced pressure and to separate the water vapor and latex in the vacuum separator. Where it is advantageous to remove solvent and concentrate the latex continuously then separate equipment units are coupled together, one unit for stripping of the solvent from the raw polymer-solvent emulsion and the other unit for concentrating of the stripped latex and advantageously may be interposed between the two units high pressure coalescing equipment. The concentrated latex effluent as a discontinuous phase from the heater exchanger with the evolved water vapor which is at least a part continuous phase, may again be separated in the separator, the vapor phase passing to the condensing equipment, and any uncondensables again passing therefrom to the vacuum pumping equipment.

8. While for economy of equipment it is sometimes preferred to employ the same segregator, with adjustment of appurtenant equipment as above described, for effecting both the stripping and the concentration, the capacity of the segregator may be adjusted to the load to be served, and when it is desired to concentrate the stripped latex without suspending the stripping operation of the equipment, one or more separate elongated paths or the like may be provided for this purpose, which may terminate in any desired separator equipment, but which preferably terminate in the same collector or separator equipment. The desired concentration may be effected in a single pass, or, if desired, in a plurality of recycles through the same or different concentrating paths. When the latex being concentrated is returned to the same segregating, separating, or collecting equipment, it is preferably distributed on the walls of the segregator, separator, or collector in such a way that the droplets of stripped latex being delivered thereto with the solvent vapor will be impinged on the recycled latex, as it has been found that this procedure tends to minimize the formation of coagulum and form.

9. The water recovered in the condensing equipment is distilled water saturated with the stripped solvent, and in accordance with the present invention it is preferred to recycle this recovered water for use in preparing the emulsion of the precursor latex sized particles of solvent solution of the high polymer composition.

10. Various of the above conditions are common to embodiments of process disclosed in the aforesaid copending applications, but the invention herein disclosed includes various additional features and combinations of features more particularly adapted to cooperate with various of the aforesaid features to effect modification of the physical and/or chemical characteristics of the latex produced and/or to facilitate the operations for producing the same. In particular, these additional cooperating features have advantages separately and collectively (a) to enable one to process to latex polymer material of intermediate or low molecular weight which facilitates the processing operation, and to convert the lower molecular weight materials in the latex into higher molecular weight form, this latter step being accomplished with the aid of cross-linking agents with or without cross-linking monomers; (b) to enable one to convert the solvent polymerized hydrocarbon polymers which, for example, have good moisture resistance, into intermediate latices and to modify such latices to form therein interpolymers containing selected polar groups which impart specific properties thereto not inherent in the hydrocarbon polymers, e.g., by incorporating into butyl rubber or hydrocarbon resin plastomer, or ethylene-propylene-copolymer elastomer, in latex form, carboxyl, hydroxyl, amide, or other groups desirable to better adapt such polymers for bonding, coating and related uses in, for example, paper manufacture; (c) to enable one to modify the latices to have narrow particle size distributions and average particle sizes near the upper end of the colloidal size range of 500 to 10,000 A; and (d) to enable one to accomplish the foregoing in various combinations to yield latices of high solids content, e.g., 60 to 68 percent solids, having various of such characteristics separately and in combination.

The objects of the invention, severally and interdependently, are to provide new apparatus features and new combinations of steps, which contribute to produce an improved process and which enable the production of new latices which may contain not only polymers and compounding ingredients such as fillers, but which in preferred embodiments may contain such compounding ingredients, e.g., reinforcing fillers, within the high polymer latex particles. Other objects and advantages of the invention will be apparent from the above general description and the following more particular descriptions of preferred embodiments thereof, which, however, are illustrative but not restrictive of the invention, the scope of which is more particularly pointed out in the appended claims.

By the term "latex" as used herein is meant an aqueous suspension of colloidal polymer particles exhibiting Brownian movement and said polymer thereof includes the following types:
  i. homopolymer,
  ii. interpolymer including block and graft polymer,
  iii. hydrocarbon polymer
  iv. polar polymer,
  v. cross-linked polymer,
  vi. non-cross-linked polymer,
  vii. polymer composition comprising polymer material selected from (i) through (vi) above and compounding ingredients including reinforcing fillers and/or non-reinforcing fillers.

By the term "colloidal" particle or "colloid" as used herein is meant particles in the size range of 500 A to 10,000 A diameter.

BRIEF DESCRIPTION OF THE DRAWING

In the accompanying drawing:

FIG. 3 is a similar diagram of a preferred form of device for dispersing the emulsion of solvent/polymer cement into the steam flow, and segregating and separating the latex phase from the vapor phase, and further treating the latex phase, corresponding to portions 14 and following of FIG. 1.

FIG. 4 is a more or less diagrammatic elevation partly cut away of a preferred embodiment of the portion 14 of FIG. 1.

FIG. 5 is a more or less diagrammatic elevation, partly cut away, of a preferred form of separator corresponding to portion 16 of FIG. 1.

FIG. 6 is a more or less diagrammatic horizontal cross-section taken on line VI—VI of FIG. 5.

Figure 1:
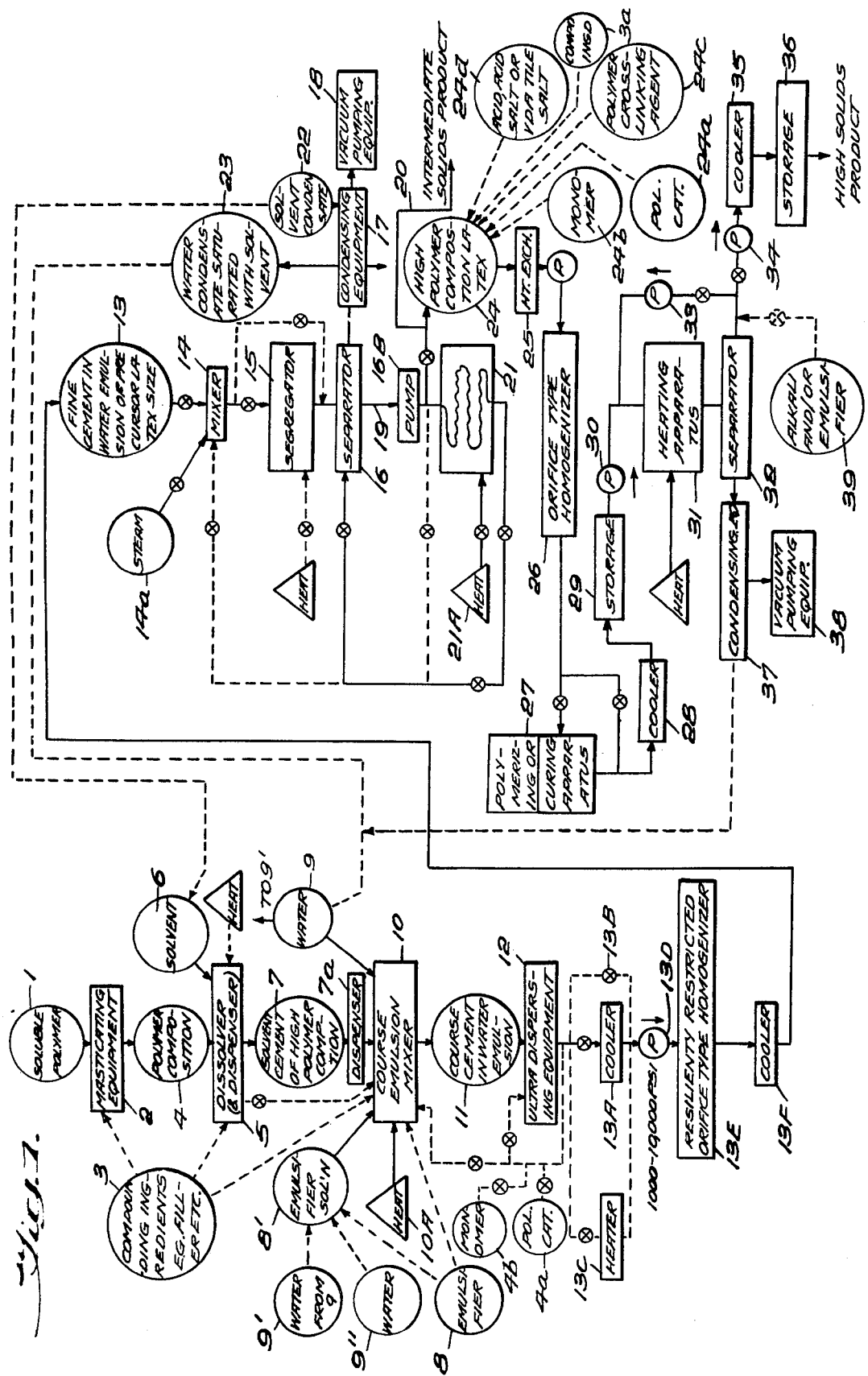
FIG. 1 is a flow sheet or diagram illustrating the sequences of steps and flow of material in typical embodiments of process acording to the invention.

DESCRIPTION OF PREFERRED EMBODIMENTS a. In General:

In the preferred embodiments illustrated in FIG. 1, the high polymer (1), e.g., elastomer and/or plastomer material as hereinafter described, is prepared as a high polymer composition (4) for conversion to a cement, as by working in appropriate masticating, comminuting, or attenuating equipment (2), such as a rubber mill, Banbury, comminutor, extruder, or the like. In accordance with the aforesaid applications provision may be made for incorporating one or more known polymer compounding ingredients (3), e.g., rubber reinforcing filler, into the said polymer composition in such a way that the ingredients (3) are thereafter contained within the polymer particles of the latex being formed, for which purpose the said ingredient or ingredients (3) may be worked into the high polymer (1) by working therewith in the masticating equipment (2). By such procedure the said polymer ingredients may become fixed to the compounding ingredient, i.e., the polymer particles can become reinforced by the fillers, and in effect become so intimately attached thereto, or embrasive thereof, as to retain the same when dispersed as a cement. In the case of compounding ingredients desired to be incorporated in the latex particles, but not requiring working with the polymer itself, such ingredients (3) may be fed into the cement forming equipment or dissolver (5) independently of the said polymer composition (4), as is also indicated in FIG. 1.

In the cement forming equipment or mixer or dissolver (5) which may also comprise a disperser, the high polymer composition (4) is combined and preferably stirred or otherwise worked with solvent (6) appropriate for the high polymer and for the process, as further described herein, to form a solvent cement (7) of the high polymer composition (4) and of any extraneously added compounding ingredients (3), the adequate dispersion of which in the cement may require vigorous working, which may even be accomplished by the passage of the cement through a suitable dispersing equipment (7a).

The solvent/polymer cement (7) is then combined with emulsifier (8) appropriate for the high polymer and the process, and with water (9) in a course emulsion mixing equipment (10) where the ingredients are mixed, preferably with the aid of heat, to form a course cement in water emulsion (11), which is then passed one or more times through an ultra-dispersing equipment (12), preferably of the type hereinafter described, which breaks up the relatively large particles of solvent-cement forming the discontinuous phase in the course emulsion (11) into particles of such small size that they will be of stable latex particle size when relieved of their solvent content, and preferably near the upper limit of such size.

In my aforesaid applications the course cement-in-water emulsion (11) was passed one or more times, usually 6 to 12 times, through one or more so-called ultradispersers (12) of the "Moulds" type more fully described hereinafter, in order to accomplish a sufficient reduction of latex particle size, and the resulting fine emulsions had rather wide ranges of cement droplet size distribution. In the present improvement, the emulsion of high viscosity solvent/polymer cement prepared with a relatively large range of droplet size distribution by the ultradisperser equipment (12), adjusted if necessary to an appropriate temperature, by the cooler 13A, by-pass 13B and/or heater 13C, is fed by suitable positive displacement, e.g., plunger pump means 13D, to a high pressure homogenizer preferably of the resiliently restricted orifice type 13E at pressures in the range of 1,000 to 10,000 p.s.i., for reducing the particle size distribution of the fine emulsion. The resulting emulsion of reduced particle size distribution is preferably cooled by a cooler 13F before being delivered to storage means such as a tank 13, for subsequent treatment. As indicated in FIG. 1 the emulsifier material (8) may be formed into an aqueous emulsifier solution (8') with water (9') saturated with solvent or with water (9") from an extraneous source.

The resulting relatively cool fine cement-in-water emulsion of precursor latex size particles (13) as in the aforesaid applications is then converted into an aerosol of which the dispersed phase may comprise colloidal and larger sized droplets in a steam/solvent vapor continuum, and is therein stripped of its solvent content without excessive foaming and while avoiding formation of coagulum. In accordance with the present invention provision is perferably made by which the temperature and pressure and the rate of evaporation of solvent from the aerosol droplets may be controlled to facilitate maintenance of the stability of the aqueous emulsion during the stripping of the solvent to produce an aerosol of latex of the polymer, as is hereinafter more fully described in connection with FIGS. 3 and 4. As in the aforesaid applications, the formation of the aerosol is preferably accomplished by providing a flow of steam (14*a*) as an initial continuous phase and introducing the oil-in-water emulsion of precursor latex sized particles (13) as a discontinuous phase into the flow of steam in a mixer (14) as the initial continuous phase, whereby volatile solvent (6) is vaporized to become the continuous phase or the principal part thereof, and a corresponding amount of steam is condensed to supply the heat of vaporization for the solvent and become added as water to the discontinuous phase. As explained in connection with FIGS. 3 and 4, in certain embodiments of the present process preferably only a part of the steam is supplied at a first station where the emulsion of polymer/solvent solution is introduced, and the remainder of the steam is introduced at one or more stations downstream from said first station in conducting the phase transition. As this phase transition is accomplished the resulting gaseous and non-gaseous phases are usually in a form resembling an aerosol and the aerosol droplets must be coalesced, with minimum coagulation, to form a latex separated from the vapor phase. This coalescing step is hampered by the fact that the coalescing material tends to produce large quantities of foam. The coalescing must therefor be conducted in a manner to either prevent or minimize the formation of foam or successfully defoam the coalesced materials.

This coalescing step may be practiced by subjecting the gaseous and non-gaseous phases to a decrease in pressure, while passing them through a segregator or coalescer (15) and while maintaining the temperatures of the flows within the limited range for stability of the emulsion (13), and the coalesced droplets, now definitely of greater than aerosol size, are collected in the form of a bulk latex from the gaseous continuous phase. As is more fully described in connection with FIG. 3, in certain embodiments of the present invention, the coalescing is accomplished by subjecting the aerosol, on its way to a reduced pressure separator 16, to the action of centrifugal force for effecting segregation or caolescence of the non-gaseous phase, as by passing the gas and latex phases of the aerosol through a centrifugal pump, and preferably a centrifugal pump having the type of pump rotor, pump chamber and inlet and outlet means illustrated in U.S. Pat. No. 3,324,798. The final separation or collection may be attained by delivering the flows from the segregator (15) into a separator or collector (16), from the lower part of which the latex is drawn, and from an upper part of which the continuous phase is passed to condensing equipment (17) maintained under vacuum, preferably a vacuum of the order of 28 to 29 inches of mercury, by withdrawal of uncondensed gases therefrom by vacuum pumping equipment (18), e.g., a steam jet, and the separator of collector (16) may be of various forms and may even be incorporated with a segregator (15) as is described in said copending application Ser. No. 691,823.

Still referring to FIG. 1, as explained in said copending application the high polymer composition latex (19) withdrawn from the separator (16) may be delivered as product (20), or may be recycled as indicated at (21) and be again fed as discontinuous phase through the steam disperser (14) and/or the segregator (15) for removal of residual solvent therefrom as above noted, either separately or concurrently with additional emulsion (13) as is indicated by the valve symbols (13) and (14) and in the lines from (16B) to (14) and from (16B) to (16) in FIG. 1; or it may be cycled through a different or the same heater and separator (21 and 16) for concentrating the latex, in which event the latex is heated to evaporate water therefrom under subatmospheric pressure at temperatures within the limited temperature range for its stability, externally to its flow path (in 21) from the valved heat sources shown connected to (15) and (21), while the supply of steam internally of the path from the valved source (14a) is reduced or cut off as aforesaid. When such concentrating step has been employed, the product (20) resulting therefrom will be a latex of increased solids content.

The present invention, however, makes provisions which may be employed for modifying the latex 20, preferably while it still contains residual solvent from having been in contact with the aqueous/solvent gaseous phase in the stripping separator 16 (see also 216, FIG. 3 and FIGS. 5 and 6). These provisions are illustrated at 24 and following in FIG. 1 herein, and in particular reside, in various embodiments of the invention, in employing the high pressure orifice type homogenizer to effect, or facilitate, the contemplated latex modifications. Thus, in these embodiments of the invention, the latex of intermediate solids content, perferably while still containing residual solvent, may be mixed in a hold tank, mixer, or proportionate feeder 24 with polymerization catalyst 24a and monomer material 24b, and after appropriate adjustment of its temperature, as by a heat exchanger means 25, may be passed at high pressure, e.g., 1,000 to 10,000 p.s.i., through an orifice type homogenizer to promote intimate association of the mixed ingredients. Such intimate association at high pressure under the extreme conditions of attenuation and working obtained in the homogenizer 26 can in certain instances partially or completely effect polymerization of the monomer materials in intimately associated or grafted form with the polymer, and in cases in which further treatment by subjection to heat energy or to the effect of high energy radiation is required to complete the polymer modification to the desired degree, the intimate dispersion and high pressure working in the homogenizer 26 facilitates such completion to produce a uniform product in the reactor, e.g., curing or polymerizing apparatus 27, to which the effluent from the homogenizer 26 may be delivered for such energy treatment. The modified polymer latex delivered by the orifice type homogenizer 26 or the energy treating reactor 27, as the case may be, is delivered to storage 29, preferably through a cooler 28, pending delivery as by a pump 30 for further treatment in heating and separating apparatus 31 and 32, which may be of the type shown at 1220 and 1216F in FIG. 3, hereinafter described. In this further treatment residual solvent, odors, and unreacted monomer, if any, may be removed, and if desired the latex may be further concentrated. The modified latex from separator 32, which in each event will have, along with other modifications, a higher solids content than the latex 20, may be passed by a pump 34 to product storage 36, preferably through a cooler 35.

In certain embodiments of the invention, the operations up to point 20 may be conducted to form the cement and latex 20 of low molecular weight polymer, which enables a cement of higher solids content to be employed without having to deal with excessively high viscosity, and monomer 24b and cat. 24a, and temperature in the homogenizer 26 or apparatus 27 may be employed in such quantities and degree as to materially augment the molecular weight of the polymer, and especially when it is desired to highly augment such molecular weight, polymer cross-linking agent 24c may be added in the mixer 24, for intimate association and reaction in the homogenizer 26 or apparatus 27.

In certain other embodiments of the invention, the size of the particles of polymer in the latex is increased as by conditioning the latex delivered from 24, preferably containing residual solvent, in a manner which will enable its dispersed particles, when finer than desired, to be caused to coalesce in groups of 2 or more particles, so as to double or triple the average size of the solids particles of the latex. To this end a stable latex delivered from 24 may be heated as at 25, to a temperature just below or approaching the maximum temperature for stabilization of the latex to sensitize the latex as by substantially reducing the proportion of its emulsifier which is stabilizing the latex particles, and the sensitized solvent containing latex is then passed at a pressure in the range of 1,000 to 10,000 p.s.i. through the constriction of the homogenizer 26. Under these conditions, this invention shows, the extreme pressure and intimate contact and working of the sensitized particles of the latex 24 in the apparatus 26 can cause the sensitized particles to cleave together to form larger particles as aforesaid, reducing the viscosity and increasing the average particle size of the latex before the final treatment in the apparatus 31 and 32.

In still other embodiments of the invention, the destabilization of the latex delivered from 24 may be effected by heating at 25 as just described, and the destabilized latex may then be cooled by at least 20° F. in a cooling section of the heat exchanger 25, and then be immediately subjected to the high pressure working in 26, following which the latex is allowed to dwell, e.g., in storage 29, until it becomes restabilized by aging.

And in still further embodiments of the invention, the destabilization of the latex at 24 is effected by adding a chemical destabilizing agent 24d, e.g., an acid or acid salt and preferably an acid or a weakly acidic volatile acid salt, which can be removed from the latex in the apparatus 31 and 32, or an acidic additive desired in the latex, as hereinafter described, in a quantity less than that which would coagulate the latex, and the thus destablized latex is then treated in the high pressure homogenizer to increase its average particle size as aforesaid. And in those embodiments of the invention in which the chemical destabilizer is not removable or removed from the latex being delivered to storage 36, an alkali, or additional emulsifier, may be added, as at 39, to restore the latex to a stable condition. For example, when acid has been added which imparts to the latex a pH of less than 6 during the treatment in homogenizer 26, the alkali may be added at 39 to adjust the pH of the latex to about 7. The final stripping, de-odorizing, and/or concentrating in separator 32 is preferably effected with the aid of condensing equipment 37 and vacuum pumping apparatus 38, and when such equipment produces a yield of recoverable fluid, e.g., pure water, such may be returned for reuse, e.g., to the water supply 9, as shown.

In a still further embodiment of the invention, exemplified in FIG. 3, the stripped latex 324 still containing residual solvent, with or without pretreatment by passage at high pressure through the constriction of homogenizer 326, is subjected to concentration, deodorizing, and stripping of residual solvent in a heating apparatus 1220 and separator 1216, and is then, as finished high solids latex, subjected to heating to an appropriate temperature at 1225, and furthr treatment by apssage at a high pressure of 1,000 to 10,000 p.s.i. through the constriction of a homogenizer 1226, with or without prior mixing in mixer 1224 with polymerization catalyst 1224a and monomer material 1224b and/or cross-linking agent 1224c for effecting grafting or cross-linking of the polymer molecules contained in the particles of the finished latex. When necessary after this treatment, the grafted or cross-linked latex may be stripped of residual volatiles and odor, as by passing it through a stripper-deodorizer-concentrator circuit, which may be the same circuit 1220–1216 isolated for this purpose as by opening valves 1227 and 1229 and closing valves 1228 and 1230. Delivery of the treated latex to storage 1233 is preferably effected after cooling in a heat-exchanger 1232, by appropriate adjustment of the valves 1227–1231.

b. The Polymer material (1).

The new process is applicable to the preparation of latices from solvent solutions or dispersions of polymer materials which are essentially solvent soluble or dispersable and essentially water insoluble, including natural rubber and polymers of ethylenically unsaturated monomer material containing from 2 to 20 carbon atoms, preferably from 2 to 10 carbon atoms. It is especially applicable to those elastomers and plastomers which, with or without plasticiser, have the foregoing properties and properties adapting their latices for use as adhesives, binders, film forming materials, coating materials, etc. Examples of such elastomers and plastomers, illustrative but not restrictive of those to which the invention can be applied, are as follows: butyl rubber, chlorinated butyl rubber, polyisobutylene, polybutadiene, polyisoprene, polyethylene, polypropylene (including both amorphous and/or crystalline polypropylene), ethylene-propylene polymer, ethylene-propylene-diene terpolymer, ethylene-vinylidene monomer interpolymers (including ethylene-vinyl acetate copolymers), butadiene-ethylene copolymers, propylene-butene-1 copolymers, butadiene-styrene copolymer, nitrile rubber (including butadiene-acrylonitrile and butadiene-methacrylonitrile copolymers), natural rubber,/hydrocarbon resins and of the foregoing polymers grafted with polar or other polymer grafts, as for example, those set forth in British Pat. No. 878,150 to Burke, published Sept. 27, 1961, and solvent soluble mixed plastomers and elastomers, e.g., butadiene-styrene-terpolymers with styrene copolymer resins including graft polymers thereof, as for example, those set forth in Hayes U.S. Pat. No. 2,802,808. Particularly included are those polymers which are prepared in essentially water immiscible organic liquid, or under essentially anhydrous conditions, from monomers unsaturated monomers having 2 to 20 carbon atoms.

c. Compounding Ingredients (3) (3a), (1223a)

The compounding ingredients which are especially contemplated in the present invention are the solid, particulate, compounding ingredients which are insoluble in the solvents (6), namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pages 278 to 345 of "Compounding Ingredients for Rubber" 3rd Edition (1961) published by Rubber World, New York, N.Y., herein incorporated by reference, and on pages 146 to 217 of "British Compounding Ingredients for Rubber" by Brian J. Wilson (1958) published by W. Heffer & Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Pat. No. 799,043 to Burke published July 30, 1958 and in chapter 15 entitled "Reinforcement of Rubber by Organic Fillers" in the treatise "Reinforcement of Elastomers" edited by Gerard Kraus (1965) published by International Publishers, New York, N.Y., herein incorporated by reference.

d. The Emulsifiers (8) (39)

The invention in its broader aspects is not dependent on the use of any particular emulsifier or combination of emulsifiers, and may be practiced with any selected emulsifier or emulsifier combination suitable for aqueously emulsifying the non-aqueous solvent solutions or dispersions of the polymer materials concerned, for which purpose the emulsifier or combination of emulsifiers must be water soluble or water dispersible. Emulsifiers capable of forming stable aqueous emulsions with polymers may be selected from the following subgroups:

a. One or more anionic emulsifiers.
b. One or more cationic emulsifiers.
c. One or more nonionic emulsifiers.
d. Combinations of anionic and nonionic emulsifiers.
e. Combinations of cationic and nonionic emulsifiers.

The anionic, cationic and nonionic emulsifiers which are water soluble usually contain from 8 to 22 carbon atoms, when non-polymeric, but such limitation does not apply to those which are polymeric, where water solubility or dispersability is the criterion. The polymeric emulsifiers are best employed in conjunction with non-polymeric emulsifiers.

Emulsifiers of the anionic, cationic, and nonionic types including in some instances those in polymeric forms are set forth in "Detergents and Emulsifiers 1967 Annual" by John W. McCutcheon, published by John W. McCutcheon, Inc., Morristown, N.J., and especially those listed therein under the headings of emulsifiers suitable for emulsion polymerization or suitable for the emulsification of polymer material, or suitable for the emulsification of hydrocarbons including hydrocarbon waxes, may be used in practicing the present invention. The use of about 10–20 percent by weight of emulsifier material based on the polymer composition content of the polymer-solvent cement in practically all instances suffices and in most instances 5 6 or less percent by weight of emulsifier based on polymer composition content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and water soluble and dispersable emulsifiers having the general formula: $R(OCH_2CH_2)_nOSO_3X$ wherein R is an aliphatic, aryl, alkaryl or cyclic radical, $n$ is 1 to 9, and X is a monovalent alkali metal or ammonium radical.

Typical anionic emulsifiers are set forth in Table A.

TABLE A

| | Typical Anionic Emulsifiers | |
|---|---|---|
| Salt | Acid or Acid Radical | Trade Name |
| 1. Potassium | hydroabietic and dehydroabietic | Dresinate 731 |
| 2. Potassium | disproportionated tall oil rosin | Indusoil JC-11B |
| 3. Sodium | hydrogenated tallow fatty acids | Armeen HT |
| 4. Sodium | lauryl sulfate | Sipex UB Dupanol WAQ |
| 5. Sodium | tallow sulfate | Conco Sulfate T |
| 6. Ammonium | mononaphthalene sulfonic acid | Lomar PWA |
| 7. Sodium | dodecylbenzene sulfate | Santomerse 85B |
| 8. Sodium | polymerized alkyl naphthalene sulfonic acid | Daxad 15 Daxad 23 |
| 9. Sodium | alkyl aryl sulfonate | Nacconol 90F Suframin OBS |
| 10. Sodium | alkylnaphthalene sulfonate | Nekal BA-75 |
| 11. Sodium | N-cyclohexyl-N-palmitoyl-taurate | Igepon CN-42 |
| 12. Sodium | lauryl ether sulfate | Sipon ES |

TABLE A-Continued

| | Typical Anionic Emulsifiers | |
|---|---|---|
| Salt | Acid or Acid Radical | Trade Name |
| 13. Sodium | alkylaryl polyether sulfate | Triton W-30 |
| 14. Sodium | sulfate ester of nonylphenoxypoly (ethyleneoxy) ethanol | Alipal CO-433 |
| 15. Ammonium | sulfate ester of nonylphenoxypoly (ethyleneoxy) ethanol | Alipal CO-436 |
| 16. Sodium | naphthalene sulfonic acid | Nacconol NRSF |
| 17. Sodium | dioctyl ester of sulfosuccinic acid | Aerosol OT |
| 18. Sodium | saponified poly-(methylvinylether/maleic anhydride) | Gantex AN-139 |
| 19. Sodium | saponified poly-(styrene/maleic anhydride) | Lytron SMA-3000A |

The cationic emulsifiers include, but are not limited to, the class of emulsifiers which are acid salts of primary secondary, and tertiary amines and the quaternary ammonium type emulsifiers. Typical cationic emulsifiers (used with acids to form water soluble salts when not quaternary ammonium compounds) are set forth in Table B.

TABLE B

| Typical Cationic Emulsifiers | |
|---|---|
| Emulsifier Base | Trade Name |
| 1. Cocoamine | Armeen C |
| 2. Sterylamine | Armeen T |
| 3. N-alkyl trimethylene diamines (alkyl groups derived from cocoanut, soya, and tallow fatty acids) | Duomeen C Duomeen T |
| 4. Primary fatty amine ethylene oxide reaction products, e.g. $RNH(CH_2CH_2O)_{25}H$ | Priminox T-25 |
| 5. Polyoxyethylated alkylamine | Katapol PN-430 |
| 6. Ethylene oxide condensates with primary fatty amines | Ethomeens |
| 7. bis(2-hydroxyethyl)cocoamine oxide | Armox C/12W |
| 8. bis(2-hydroxyethyl)tallow amine oxide | Armox T/12 |
| 9. Amine and quaternary ammonium compounds suitable as asphalt emulsifiers | Redicote Series e.g. Redicote E-4, E-5, E-9, E-12 and E-N. |
| 10. $C_{18}H_{37}(CH_3)_2NCl$-$(CH_2)_3(CH_3)_3NCl$ | Redicote E-11 |
| 11. di-isobutyl phenoxy ethoxy ethyl dimethyl ammonium chloride | Hyamine 1622 |
| 12. N-alkyl trimethylammonium chloride (alkyl = coco or steryl radical) | Arquads |
| 13. polyvinylpyrrolidine | PVP |

Non-ionic emulsifiers can be selected from the class of emulsifiers which are alkyl polyoxyethylene ethers and alcohols, or polyethylene ethers and alcohols. Other non-ionic emulsifiers include those which are polyoxyalkenated alkyl phenols or alcohols having the formula $R(OCHR_1CHR_1)_nOH$ where R is an alkyl, aryl or alkaryl group, $R_1$ is an alkyl group or hydrogen and $n$ is an integer of 4 to 10 or even higher. Compounds of this type are prepared by condensing an alkyl phenol or an alcohol with ethylene oxide or propylene oxide. Typical nonionic emulsifiers are set forth in Table C.

TABLE C

| Typical nonionic Emulsifiers | |
|---|---|
| Chemical Name | Trade Name |
| 1. Nonylphenoxypoly(ethyleneoxy)-ethanol | Igepal CO-970 |
| 2. nonylphenyl polyethylene glycol ether | Tergitol TP-9 |
| 3. polyethyleneglycol fatty ester | Modecol L. |
| 4. coconut alkanolamide | Monamine AA-100 |
| 5. polyethyleneglycol 400 monolaurate | Pegmol-5942 |
| 6. propyleneglycol monolaurate | — |
| 7. castordiethanolamide | Emid-6547 |
| 8. ethylene oxide condensate with primary fatty amides | Ethomids |
| 9. fatty alcohol polyglycolether | Lorox |
| 10. sorbitolsesquioleate | Nonion OP-83 |
| 11. polyoxyethylene lauryl ether | Brij-35 |
| 12. polyoxyethylene lauryl alcohol | Igepal-430 |
| 13. polyetherated fatty alcohols | Emulphor-CN  Emulphor-CN-870 |
| 14. polyoxyethylated octyl phenol having 8 to 10 ethylene oxide units | Triton X-100 |

The Polymeric Emulsifiers include the water dispersible polyelectrolytes set forth in Hedrick and Mowry's U.S. Pat. No. 2,625,529 relating to "Methods of Conditioning Soils." In said patent are listed a number of water-soluble polyelectrolytes and these materials are defined as "synthetic water soluble polyelectrolytes having a weight average molecular weight of at least 10,000 and having a structure derived by the polymerization of at least one monoolefinic compound through the aliphatic unsaturated group and substantially free of cross-linking." The present invention has shown that these synthetic water soluble polyelectrolytes can be employed as emulsifiers for the preparation of latices as herein set forth. The disclosed polyelectrolytes of this patent are therefor incorporated herein by reference, it being noted however that the lower limit of molecular weight prescribed by the patentee does not apply, the applicable criterion being that the materials are water soluble or water dispersible emulsifiers.

Combinations of emulsifiers—The present invention has disclosed that by using certain combinations of emulsifiers, it becomes possible to prepare a stable latex from aliphatic hydrocarbon polymers dissolved in hydrocarbon solvents and even in aromatic solvents, as is desirable under certain processing conditions. An effective emulsifier combination for aqueously emulsifying 100 parts by weight of a hydrocarbon rubber dissolved in from about 300 to 600 parts of an aromatic hydrocarbon solvent such as toluene, may comprise 10 parts by weight of a nonionic emulsifier, e.g., polyoxyethylated octyl phenol such as Triton X-100, a trade mark product and one part by weight of an anionic emulsifier, e.g., sodium lauryl sulfate.

Another effective emulsifier combination for 100 parts by weight of hydrocarbon rubber dissolved in about 400 parts of aromatic solvent such as toluene combines 3 parts by weight of the aryl anionic emulsifier, sodium salt of an alkaryl polyether sulfate, e.g., Triton W-30 (a trade mark product) and 3 parts by weight of the non-aryl anionic emulsifier sodium lauryl sulfate, e.g., Dupanol WAQ (a trade mark product).

It has for some time been a desideratum in the art to have a stable hydrocarbon rubber latex suitable for combination with asphalt or asphalt emulsions, for road surfacing and roofing purposes, for example. Application Ser. No. 691,823 has disclosed that latices of hydrocarbon rubber such as butyl rubber, polyisobutylene, ethylene-propylene rubber or rubbery amorphous polypropylene, which are suitable for such use, can be prepared by employing as emulsifier for the hydrocarbon solvent solution of the rubber a combination of emulsifiers in which one or more quaternary ammonium emulsifiers (e.g., the quaternary ammonium compounds supplied under the Redicote trade mark), are combined with one or more fatty acid amine or diamine type emulsifiers in the ratio of quaternary ammonium to fatty acid amine in the range of from 1:5 to 5:1, notwithstanding that the quaternary ammonium emulsifiers alone, for the most part, will not form stable aqueous emulsions with the above types of hydrocarbon polymers.

For example a stable aqueous latex is obtained from hydrocarbon rubber, e.g., butyl rubber or ethylenepropylene rubber, dissolved in an aliphatic or even an aromtic solvent, e.g., hexane, benzene, toluene and/or the zylenes, with the aid of a mixture of the emulsifiers selected from subgroups $(a)$ and $(b)$ in the ratio of 0.5:5 to 5:0.5 parts by weight, said mixture being employed in the amount of 2 to 10 parts by weight based on the polymer, and said sub-groups $(a)$ and $(b)$ being represented by formulae I and II respectively:

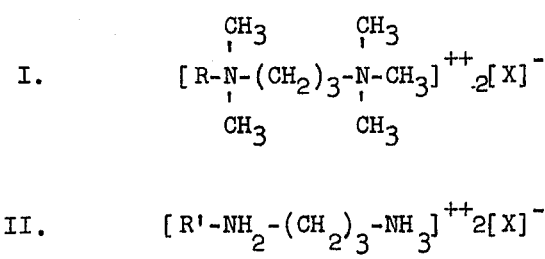

wherein R and R' are selected from the alkyl radicals having from 8 to 22 carbon atoms and X is an acid anion, preferably the alkyl radicals being those derived from cocoanut oil and/or tallow fatty acids.

The quantity of emulsifier employed in this invention is in the range of 2 to 20 by weight and preferably 5 to 10 percent by weight based on the high polymer composition; and if desired, small additions of electrolyte may be made to the latex or in preparing the course or fine emulsion, as, for example, in accordance with the practices referred to in U.S. Pat. Nos. 2,955,094 issued Oct. 4, 1960 and 3,222,311, issued Dec. 4, 1965, to Esso Research and Engineering Company, as assignee of R. S. Brodkey et al, and A. L. Miller et al. Alkali metal acid phosphate salts are suitable for this purpose, and are also useful in connection with the use of the additurent 24$d$ (FIG. 1) as above described, for reducing the quantity of said additeuent e. Monomer Materials (4$b$), (24$b$), (1224$b$)

The ethylenically unsaturated monomer material employable herein is selected from the class consisting of:-
  i. the mono-ethylenically unsaturated aromatic hydrocarbon monomers containing from 8 to 18 carbon atoms,
  ii. the conjugated diene hydrocarbon monomers containing not more than 12 carbon atoms,
  iii. the non-conjugated diene hydrocarbon monomers containing not more than 18 carbon atoms,
  iv. the mono-ethylenically unsaturated monomers containing polar groups and having not more than 18 carbon atoms, and
  v. the non-conjugated diene and triene monomers containing polar groups and having not more than 22 carbon atoms, the polar groups of (iv) and (v)

being selected from the class consisting of carboxyl, hydroxyl, carbonyl, ester, ether, nitrile, amine, quaternary ammonium, amide, triazine, and halogen groups,.

Examples of the mono-ethylenically unsaturated aromatic hydrocarbon monomers of group (1) include vinyl, vinylidene and allyl aromatic monomers such as styrene, the vinyl toluenes, the methyl styrenes, the ethyl styrenes, the propyl styrenes, the vinyl biphenyls, the vinyl naphthalenes, the α and/or β alkyl substituted vinyl aromatics such as α -methyl styrene, isopropenyl biphenyl, and the like.

Examples of the conjugated diene monomers of group (ii) include hydrocarbon conjugated dienes such as butadiene-1,3, isoprene, 2,3-dimethylbutadiene-1,4, piperylene, pentadiene-1-3, 2-phenyl-butadiene-1,3, and the like; the polar conjugated dienes such as 1- and 2-cyano-butadiene-1,3, 2-chlorobutadiene-1,3 and the like.

Examples of the non-conjugated diene hydrocarbon monomers of group (iii) include: the dialkene aryl compounds and derivatives including the divinyl-, divinylidene- and diallyl aryl compounds, such as divinyl benzenes, divinyl toluenes, divinylxylenes, divinyl ethyl benzenes, divinyl biphenyls and divinylnaphthalenes, divinyl methylnaphthalenes, and the like.

Examples of the mono-ethylenically unsaturated monomers of group (iv) which have polar groups selected from the class consisting of carboxyl, hydroxyl, ester, carbonyl, ether, nitrile, amine, quaternary ammonium, amide, triazine, and halogen groups include:

(a) among the carboxyl group containing monomers -- the olefinic acids and their derivatives such as acrylic acid and the alpha and/or beta alkyl, aryl, and alkaryl substituted acrylic acids such as the methyl, ethyl, propyl, butyl, isobutyl, phenyl, tolyl and the like alpha and/or beta substituted acrylic acids including α -methacrylic acid, α-ethacrylic acid, α -propylacrylic acid, α-butylacrylic acid and α -phenylacrylic acid, and the like, and further including the oxy, hydroxy and halogen, including the fluoro, chloro, and bromo derivatives of these olefinic acids and substituted olefinic acids and the like; the half alkenyl esters of saturated dicarboxylic acids such as the vinyl, vinylidene and allyl half ester of such saturated dicarboxylic acids as oxalic, malonic, succinic, glutaric, adipic, tartaric, citric, phthalic and the like;

b. among the hydroxyl groups containing monomers -- the partial esters of polyols and olefinic acids such as the mono-glycol esters, the mono-glycerol esters, the monopropylene glycol esters of olefinic acids including acrylic, methacrylic, ethacrylic and the like;

c. among the ester group containing monomers -- esters of olefinic acids including α and β substituted olefinic acids and including alkyl, alkenyl, aryl, aralkyl esters such as the methyl, ethyl, propyl, butyl, isobutyl, pentyl, hexyl, cyclohexyl, phenyl esters of acrylic, methacrylic, ethacrylic, and the like; and including the α -haloacrylates such as methyl α-chloroacrylate, propyl α-chloroacrylate and the like; the esters of olefinic alcohols with saturated acids, such as allyl, methallyl, crotyl, 1-chloroallyl, 2-chloroallyl, cinnamyl, vinyl, methylvinyl, 1-phenylallyl, butenyl and the like esters of saturated aliphatic and aromatic monobasic acids as vinyl and allyl acetate, isopropenyl acetate, vinyl formate, vinyl- 2-ethyl hexoate, methyl vinyl acetate, vinyl and allyl propionate, n-butyrate and isopropenyl propionate, isopropenyl butyrate, vinyl and allyl benzoate, and the like; the dialkyl esters of olefinic dicarboxylic acids such as the dialkyl esters and mixed dialkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as diethylchloromaleate and the like;

d. among the carbonyl group containing monomers -- the olefinic aldehydes such as acrolein, methacrolein, crotonaldehyde and the like; the alkenyl ketones such as methyl vinyl ketone, isopropenyl methyl ketone, allyl methyl ketone, mesityl oxide, allyl phenyl ketone and the like;

e. among the ether group containing monomers -- the olefinic ethers such as vinyl ethyl ether, vinyl butyl ether, vinyl cyclohexyl ether, vinyl phenyl ether, vinyl benzyl ether, methyl isopropenyl ether, allyl ethyl ether, methallyl ethyl ether, chloroallyl ethyl ether and the like;

f. among the nitrile group containing monomers -- the olefinic nitriles such as acrylonitrile, methacrylonitrile, ethacrylonitrile, chloroacrylonitrile and the like;

g. among the amine group containing monomers -- the olefinic amines, such as N,N-dimethyl allyl amine, allylamine, N,N-diethyl, dipropyl, dibutyl, diisobutyl, diphenyl and similar allylamines and N-allyl morpholine, N-allyl-pyridine, N-allylethyleneimine and the like; the amino olefinic ethers such as the amino vinyl ethers including aminoethylvinyl ether, N-ethylaminoethylvinyl ether, amino propylvinyl ether, N-methylaminoethylvinyl ether, N,N-diethylaminoethylvinyl ether and the like; nitrogen containing esters of olefinic acids such as aminocyclohexyl methacrylate, triethanolamine monomethacrylate, β -piperidyl-N-ethyl methacrylate β -morpholine-N-ethyl methacrylate, N-methacrylyl morpholine, N-methacrylyl thiomorpholine, N-emthacrylyl piperidines, N-acrylyl morpholine, N-acrylyl thiomorpholine, N-acrylyl piperidine and the like; the N-vinyl monomers such as N-vinylpyrrole, N-vinyl carbazole, N-vinylindole, N-vinyl succinimide and the like; N-vinyl lactams such as N-vinyl caprolactam, N-vinyl butyrolactum and the like; the acylamino substituted acrylic and α and β -acrylic acid esters such as the methyl, ethyl, propyl and the like alkyl esters of α -acetoaminoacrylate, α -N-butylaminoacrylate and the like; the vinyl pyridines such as 2-vinylpyridine, 3-vinylpyridine, 4-vinylpyridine, 2-vinyl-5-ethylpyridine, 2-methyl-5-vinylpyridine and the other ethyl and methyl isomers of vinylpyridine and the like;

h. among the quaternary ammonium group containing monomers -- the quaternary ammonium monomers which comprise methacryloxyethyltrimethylammonium sulfate and various quaternizing reaction products of quaternizing agents such as alkyl halides, alkyl sulfonates, alkyl phosphates and the like (e.g., methyl bromide and toluene sulfonate) with tertiary amine monomers such as β -dimethylaminoethyl methacrylate, methyl α -diethyl aminoacrylate, methyl α-(N-methylanilino)-acrylate, methyl α-dibenzylaminoacrylate, methyl α-distearylamino acrylate and the like;

i. among the amide group containing monomers -- the amides and substituted amides of acrylic acid and α and β-substituted acrylic acids such as acrylamide, methacrylamide, ethacrylamide, N-methacrylamide, N-methlmethacrylamide, N,N-bis (hydroxyethyl) acrylamide, N,N-diethylacrylamide, N,N-ethylmethylacrylamide and other mono- and di- N substituted unsaturated acid amides where the substituent is $C_1$ to $C_5$ alkyl alkoxy, haloalkyl and the like; the fluoro-substituted amides of olefinic acids such as N-(2,2,3-trifluoroethyl) acrylamide, methacrylamide, N-(2,2-difluoromethyl) acrylamide and methacrylamide;

j. among the triazine group containing monomers -- the monoolefinic triazine monomers including triazine monomers in which one of the carbons of the triazine ring is attached to a vinyl, allyl, methallyl, crotyl, 1-chloroallyl, 2-chloroallyl, cinnamyl, butenyl radical or the like and the other carbons of the triazine are attached to cyano, halo (F, Cl, Br), amino, cycloaliphatic (e.g., cyclopentyl, cyclohexyl, etc.), aromatic-substituent (e.g., phenyl, biphenyl, naphthyl, etc), alkylaryl (e.g., tolyl, xylyl, ethylphenyl, etc.) halogenated aromatic and the like; the N-vinyl and allyl guanidines and including allyl melamine, allyl isomelamine and the like; the N-vinyl-N-alkylguanidines such as N-vinyl-N-n-butylguanidine, N-vinyl-N-benzyl guanidine, acryloguanamine, methacryloguanamine and the like; and k. among the halogen group containing monomers -- the olifinic halides, such as vinyl fluoride, vinyl chloride, vinyl bromide, vinylidene fluoride, vinylidene chloride, allyl fluoride, allyl chloride, α-methallyl fluoride, α-methallyl chloride, α-ethallyl fluoride or chloride or bromide, tetrafluoroethylene, trifluorochloroethylene, dichloridifluoroethylene, trichlorofluoroethylene, perfluoropropylene, 1-phenyl-1,2 difluoroethylene, trichloroethylene and the like; olefinic acid esters of fluoro alcohols such as the α-trifluoromethyl acrylic acid esters such as the methyl esters or the ester of prefluoroethanol or the partially fluorinated alcohols, that is the fluoroalkanols such as octafluoropentanol and the like; and halogen substituted aryl olefines such as the halo (F, Cl, Br) substituents including the mono, di, tri, and tetra chloro styrenes, the fluorostyrenes, the chlorovinyl toluenes, the fluorovinyl toluenes, the cryano styrenes and the like monomers.

Examples of the non-conjugated diene and triene monomers of group (v) containing polar groups from the glass consisting of carboxyl, hydroxyl, ester, carbonyl, ether, nitrile, amine, quarternary ammonium, amide, triazine and halogen groups include:

(a), (b), (c) among the carboxyl group, hydroxy group, and ester group containing monomers -- the olefinic dicarboxylic acids and their acid anhydrides and the half alkyl, aryl and alkaryl esters of olefinic dicarboxylic acids such as maleic, citraconic, itaconic, mesaconic, fumaric, muconic and similar acids including their acid anhydrides such as maleic anhydride and the like and the alkyl and aryl half esters of these olefinic dicarboxylic acids like monoethyl fumarate, monomethyl itaconate and the halo-derivatives of these such as chloromaleic anhydride; the olefinic nitrile and other polymerizable olefinic nitriles and these can be polymerized and can then have their cyano groups converted to carboxyl groups by saponification with a strong alkali such as sodium hydroxide or potassium hydroxide; monomers having a plurality of polymerizable unsaturated carbon-to-carbon bonds at least two of which are non-conjugated, including the polyunsaturated esters of olefinic alcohols and unsaturated monocarboxylic acids such as the vinyl, vinylidene, and allyl, methallyl, crotyl, 1-chloroallyl, 2-chloroallyl, cinnamyl, methyl vinyl, 1-phenyl allyl, butenyl esters of unsaturated monocarboxylic acids such as vinyl acrylate, the vinyl and allyl esters of α and β substituted acrylates such as vinyl methacrylate, vinyl crotonate, vinyl ethacrylate, allyl methacrylate, allyl ethacrylate, vinyl α-chloroacrylate, allyl α-hydroxyethyl acrylate, and the like; the polyunsaturated esters of saturated dicarboxylic and polycarboxylic acids such as the vinyl, vinylidene, allyl, methallyl, crotyl, 1-chloroallyl, 2-chloroallyl, cinnamyl, methyl vinyl, 1-phenyl allyl, butenyl esters and mixed esters of such dicarboxylic acids as oxalic, malonic, succinic, glutaric, adipic, tartaric, citric, and the like including such monomers as diallyl oxylate, diallyl sebacate, diallyl adipate, diallyl succinate, diallyl malonate, triallyl citrate and the like; polyunsaturated esters of unsaturated polycarboxylic acids, such as the vinyl, vinylidene, allyl, ethallyl, crotyl, 1-chloroallyl, 2-chloroallyl, cinnamyl, methyl vinyl, 1-phenyl allyl, butenyl esters and mixed esters of the unsaturated polycarboxylic acids such as maleic, citraconic itaconic, mesaconic, fumaric, muconic, chloromaleic, aconitic and the like including such monomers as diallyl fumarate, diallyl homophthalate, diallyl itaconate, diallyl ester of muconic acid, diallyl maleate, diallyl phthalate, diallyl isophthalate, diallyl terephthalate, triallyl aconitate and the like; polyhydroxy esters of unsaturated acids such as the glycol esters, glycol ether esters, the trihydroxy-, tetrahydroxy-, pentahydroxy-, hexahydroxy- esters including the glycerides, the pentoses, the hexoses esters of acrylic acid and α and β-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and including the pentose and hexose diesters and triesters of acrylic acid and the α - and β - substituted acrylic acids, such as pentose dimethacrylate, hexose triacrylate and the like; unsaturated half esters of unsaturated dicarboxylic acids including the vinyl, vinylidene and allyl half esters of the unsaturated dicarboxylic acids such as maleic, citraconic, itaconic, mesaconic, fumaric, muconic, chloromaleic, aconitic and the like, such as monoallyl maleic acid, mono-vinyl itaconic acid and the like; reaction products of alkenyl halide with a polyhydric alcohol such as allyl chloride, allyl bromide, methallyl chloride, methallyl bromide, crotyl chloride reacted with such alcohols as butane triols, erythritols, saccharides, polysaccharides and other sugars such as glycose, sucrose, maltose, arabitol, mannitol, starches and the like; and other monomers containing a carboxyl group and a plurality of unsaturated double bonds;

d. among the carbonyl group containing monomers -- polyunsaturated ketones such as divinyl ketone, diallyl ketone, and the like;

e. among the ether group containing monomers- polyunsaturated ethers such as divinyl ether, diallyl ether, divinyl carbitol, divinyl ether of diethylene glycol, diallyl and triallyl glycerol ether, diallyl 1,2-propanediol ether, diallyl 3-butene- 1,2,3-propanetriol, diallyl and triallyl ethers of 1-phenyl-1,2,3-propanetriol, diallyl-1,5-naphthalenediamethyol ether, and the like;

f. among the nitrile group containing monomers -- the allyl ester of α-cyanoacrylate, and the like;

g. among the amine group containing monomers -- diallyl amine, triallyl amine, and the like;

h. among the quaternary ammonium group containing monomers -- tetra allyl ammonium chloride, methyl-triallyl ammonium bromide, methyl-benzyl-diallyl ammonium bromide, reaction products of maleic anhydride, and triallylamine quaternized with allyl chloride, and the like;

i. among the amide group containing monomers -- polyunsaturated acid amides such as N,N-diallyl acrylamide, N,N-diallyl methacrylamide, N,N-methylene bisacrylamide and the like;

j. among the triazone group containing monomers- polyunsaturated triazines, the diallyl cyanurate, N,N-diallyl melamine, 2,4-diallyloxy-6-amino-5-triazine, the di and tri- vinyl cyanurates and derivatives of these and the like; and k. among the halogen group containing monomers -- the halo (F, Cl, Br) mono-, di and poly- substituted divinylbenzenes, divinyl naphthalenes, divinyl biphenyl oxides, divinyl tolunes, and the like.

Further examples of monomers of the class and sub-classes defined, which are employable herein and are set forth in Burke, et al. U.S. Pat. No. 3,144,426, columns 5 to 7, and are herein incorporated by reference.

The foregoing monomers include monomers which are predominantly water soluble as well as monomers which are predominantly oil soluble, and when it is desired to produce an interpolymer latex, it is preferred to employ monomers predominantly soluble in the polymer phase of the latex and in any event to effect the polymerization with the aid of predominantly oil soluble polymerization catalyst or a redox system at least a compound portion of which is predominantly soluble in the monomer polymer phase. The oil and water solubilities of monomer and catalyst materials are known to or readily determinable by those skilled in the art.

(f) Free-Radical Generating Polymerization Catalysts (4a), (24), (1224a).

The free-radical generating catalyst and catalyst systems useful in the range of 0.8 to 20 parts per 100 parts of added monomer materials employed in certain embodiments of the present invention constitute a well-known class which includes: the inorganic peroxides such as hydrogen peroxide and the like; the various organic peroxy catalysts, such as the dialkyl peroxides, e.g., diethyl peroxide, diisopropyl peroxide, dilauryl peroxide, dioleyl peroxide, distearyl peroxide, di-(tertiary-butyl) peroxide; di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis (isobutyronitrile), 2-azobis (2-methylbutyronitrile), 1-azobis (1-cyclohexan-carbonitrile) and the like, and other free radical generating catalysts employable in emulsion polymerization, such as peroxy-catalyst compounds in combination with a reducing compound such as an amine, e.g., triethylene tetramine or tetraethylene pentamine, with or without metallic ion combination, e.g., ferrous ions, which systems are preferred to as "redox" free-radical generating catalyst systems, which latter are further exemplified in the treatise "Emulsion Polymerization" by F. A. Bovey, et al, 1955 Interscience Publishers, Inc., New York, N. Y. at pages 71–93, herein incorporated by reference.

(g) Cross-linking Agents (24c), (1224c)

The cross-linking agents useful, in the range of 0.1 20 parts per 100 parts of polymer content of the latex by weight, for effecting the cross-linking employed in particular embodiments of the present invention, also form a wlee-known class of materials which includes: elemental sulfur, selenium and tellurium, and compounds containing these elements, usually in their lower valence states or covalance states, and other polyfunctional free radical generating catalysts. Compounds which liberate sulfur, selenium or tellurium during irradiation or during heat aging (100° to 200° C.) are useful. Polymers containing sulfur, selenium or tellurium and/or monomers capable of forming such polymers are also useful. Conventional rubber vulcanizing agents and vulcanizing accelerators are particularly adapted to this application. Specific compounds of the class are: The mercapto thiazoles, such as 2-mercaptobenzothiozole and its salts, for example its zinc salt, thiuram sulfides, such as tetraethylthiuram monosulfide and tetrabutylthiuram monosulfide; guanidines, thiourea, substituted thioureas, thiocarbanilides, substituted thiocarbanilides such as o-dimethylthiocarbanilide and its isomers and alkyl homologs; zinc dialkyl dithiocarbamates such as zinc dimethyl dithiocarbamate, zinc diethyldithiocarbamate, zinc dibutyl dithiocarbamate, and zinc dibenzyl dithiocarbamate or accelerators containing these materials, thiurams such as tetramethylthiuram disulfide, tetraethylthiuram disulfide, and other tetra substituted thiuram disulfides; selenium dialkyl dithiocarbamates such as selenium diethyldithiocarbamate; 2-benzothiazyl-N,N-diethylthiocarbamyl sulfide; sodium or potassium dimethyldithiocarbamate; xanthates such as dibutyl zanthogen disulfide and Naugatuck Chemical's CPB and ZBX; alkyl phenol sulfides; bis (dimethylthiocarbamyl) disulfide, dipentamethylene tetrasulfide; and sulfur containing polymers such as Thiokol VA-3, 4,4-dithiomorpholine and disulfides such as benzothiazyl disulfide. In fact, any compound in which sulfur, selenium or tellurium is attached only to an atom of carbon, hydrogen, nitrogen or to another sulfur, selenium or tellurium atom, as the case may be, may be suitable.

Also included in the class are the sulfonyl hydrazides and disulfonyl hydrazides. The latter are particularly useful since they contain two widely separated sulfur-bearing moieties capable of forming sulfur cross-links or free radical derived cross-linkages (as a result of thermal loss of nitrogen). Blowing agents such a p,p'-oxybis (benzene sulfonyl hydride), p,p'-diphenyl bis(-sulfonyl hydrazide) and m-benzene-bis(sulfonyl hydrazide) are examples of additives which can also be employed as cross-linking agents.

Included in the class are the cross-linking azo compounds, e.g., di-cyano-azo-butane; and the like.

Included in the class are also the peroxy compounds such as bis($\alpha$-, $\alpha$-dimethyl-dicumy) peroxide (dicumyl peroxide), 1,3-bis($\alpha$-, t.butylperoxypropyl) benzene, 2,5-bis(t.butylperoxy) -2,5-dimethylhexane, 2,5-dimethyl-2,5-di(t.-butylperoxy)hexyne-3, di($\alpha$, $\alpha$-dimethyl-p-chlorobenzyl)peroxide, di($\alpha$-, $\alpha$-dimethyl-2,4-dichlorobenzyl) peroxide, di($\alpha$, $\alpha$-dimethyl-naphthyl)peroxide and the like.

Further included in the class are combinations of the above said peroxy compounds and the above said sulfur, selenium and tellurium compounds. ps (h) Latex destablizing agents (24d)

The latex destablizing agents employed in certain embodiments of the present invention are latex coagulating agents employed in insufficient quantity to coagulate the latex. Such destabilizing agents thus are selected from the class consisting of (i) which are sufficiently low boiling and weakly acidic to enable their removal from the latex or (ii) which are desirable additives to the latex, namely, (a) acetic acid, ammonium carbonic acid slats, namely ammonium carbonate and ammonium bicarbonate, and (b) phosphoric acid, alkali metal acidic salts of phosphoric acid, and ammonium acidic salts of phosphoric acid; and the less preferred destabilizer acidic additives which can be employed without the advantages of (i) and (ii) namely (iii) sulfuric acid, hydrochloric acid, and alkali metal acidic salts of sulfuric acid and phosphoric acid and ammonium salts of sulfuric acid and phosphoric acid and the like.

The particular quantity of destablizing agent to be employed varies somewhat with the nature and condition of the latex, but is readily determined in any particular case by measuring the quantity of destabilizer just sufficient to coagulate a sample of the latex and then employing a lesser quantity of destabillizer, which, while not critical as to outside limit, is preferably from about one-half to two-thirds of the determined coagulating quantity.

(i) Ionizing Radiation

The ionizing radiation employed in certain embodiments of the present invention is of a type known to those skilled in the art, viz: it is radiation with sufficient energy to remove an electron from an atom, forming an ion pair; this requires an energy of about 32 electron volts (ev), for each ion pair formed. This radiation has sufficient energy to non-selectively break chemical bonds; thus, in round numbers radiation with energy of 50 electron volts (ev.) and above is effective for the process of this invention. Such ionizing radiation is generally classed in two types; high energy particle radiation, and ionizing electromagnetic radiation. The effect produced by these two types of radiation is similar, the essential requisite being that the incident photons have sufficient energy to break chemical bonds and generate free radicals.

The preferred radiation for the practice of the said embodiments of this invention is high energy ionizing radiation, and has an energy equivalent to at least 0.1 million electron volt (mev.). Higher energies are even more effective; there is no known upper limit, except that imposed by available equipment and the product stability.

When irradiation is employed in the present invention, it is preferably effected at about atmospheric pressure and at temperatures between about 5° and 95° C., a temperature of about 25°–65° C. being preferred.

As is well known in the irradiation grafting of solid substrates, the optimum dose of irradiation varies with the particular materials concerned, a dose of about 5,000 rads (0.005 mrad) being required for significant grafting. Dosages and dosage rates may be selected between the limits which with given latices and under the conditions concerned are sufficient to not require excessive time of treatment and those not so high as to cause excessive rise of temperature, e.g., above 95° C., or excessive decomposition of materials concerned. Such limits are well understood by those skilled in the irradiation art, and are readily determined for particular materials by simple tests as above indicated.

(j) Equipment

Homogenizers — While the invention in its broader aspect is not limited to any particular homogenizer, the invention has disclosed that certain types of homogenizer described in Mould, Jr. U.S. Pat. No. 3,195,867* and Hager U.S. Pat. No. 3,194,540* as suitable for low viscosity materials such as milk, oil, fruit slurries, etc., can be employed effectively as an ultra-disperser of aqueous emulsions of highly viscous solutions of polymer compositions, especially when connected in tandem, and/or for recycle, and in particular that a combination of such "Mould" type homogenizers followed by a resiliently restricted orifice type high pressure homogenizer (1,000 to 10,000 p.s.i.) e.g., of the Gaulin type (see Gaulin U.S. Pat. Nos. 753,792* and 856,953* as available from Manton-Gaulin Mfg. Co., Inc., as model K24-3BS but provided with a 75 horsepower motor, provides an aqueous emulsion of solvent-/polymer cement yielding a latex having latex particles of an average diameter near the upper end of the colloidal size range suitable for high solids polymer latices, and of relatively narrow particle size distribution.

Figure 2:
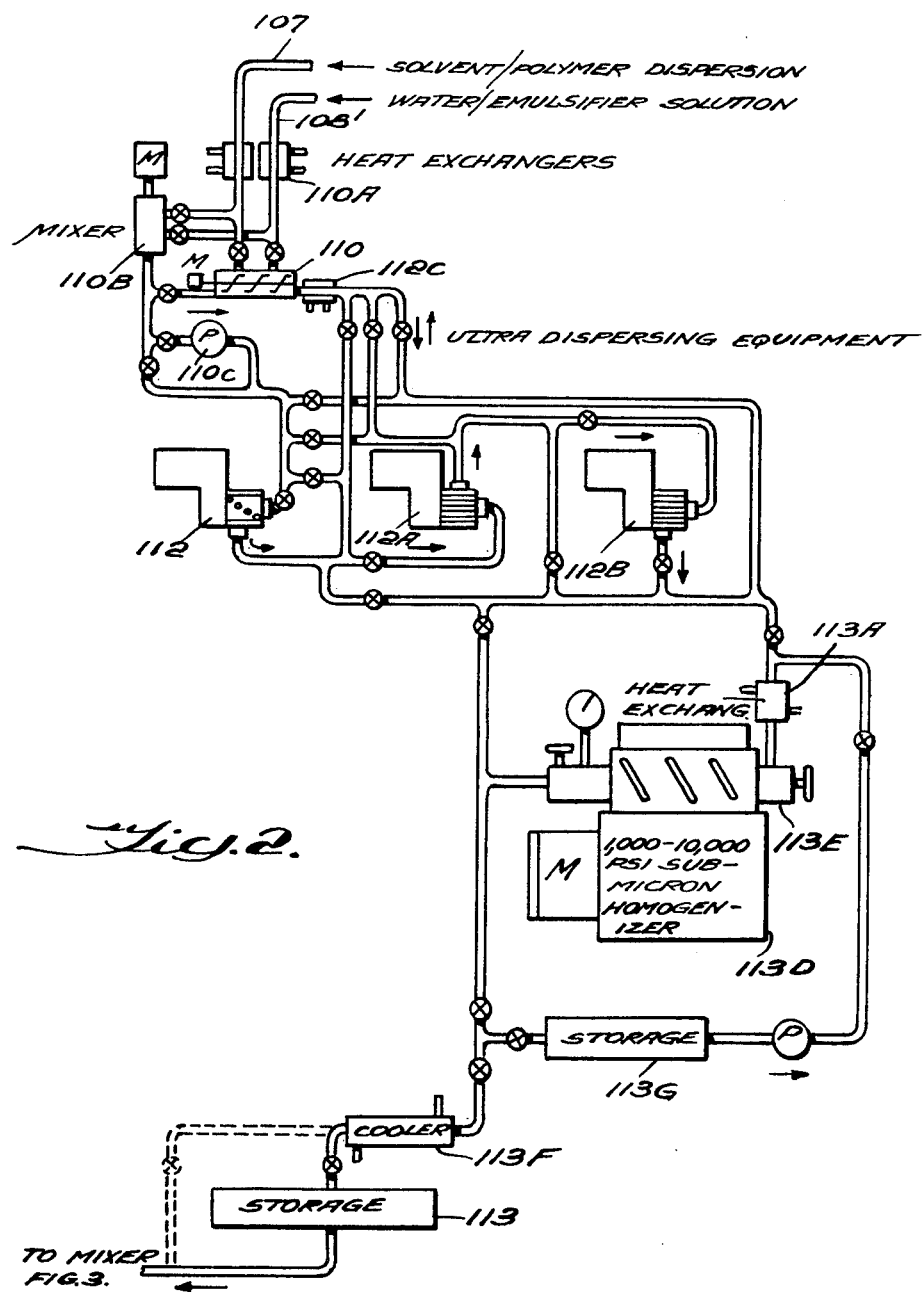
FIG. 2 is a diagram of a preferred form of equipment for preparing the emulsion, corresponding to portions 7–13 of FIG. 1, the corresponding elements having the same numerals raised by 100, and respective parts thereof being designated by modifying letters.

In FIG. 2 there is shown an arrangement of such Mould type and Gaulin type homogenizers to constitute a preferred cement emulsifying equipment. This arrangement is provided with optional facilities selectively employable by means of valves for continuous or batch operation, for single unit or tandem unit operation, and for selective complete or partial recycle in each mode of operation, and it will of course be understood that where certain of these optional facilities are not desired they may be omitted without departing from the invention.

In this FIG. 2 arrangement the solvent and polymer dispersion 107 and the water and emulsifier solution 108' are adjusted in temperature by heat exchangers 110A and passed to the course emulsion mixer equipment. For batch operation, as show, this equipment may be in the form of a hold tank 110 provided with an agitator. For continuous operation, as shown, it may be in the form of in-line mixing equipment 110B. The in-line mixer equipment 110B may also be employed to premix the materials being delivered to tank 110 for batch operation. The coarse emulsion in batch operation is passed from tank 110 under gravity head and/or pressure head contributed by pump 110C to the ultra-dispersing equipment 112 and/or 112A and/or 112B, or for continuous operation may be passed to the latter directly from the in-line mixer equipment 110B, and under the head developed thereby augmented, if desired, by the head developed by pump 110C. The coarse emulsion under pressure as aforesaid may be passed through any one of more of the ultradispersing equipments 112-112B and may be recycled therethrough either directly, or by way of the coarse emulsion tank 110. When the preparation of the emulsion of precursor latex sized particles has been completed this intermediate product may be delivered to storage 113, preferably being cooled by means of a cooler 113F to assure maintenance of the emulsion even with minimum quantities of emulsifying agent present. As is indicated in FIG. 2, effective results have been attained by repeatedly passing the coarse emulsion through an equipment 112 of the perferated stator type shown in Mould, Jr. U.S. Pat. No. 3,195,967, and then through one or more equipments 112A and/or 112B in tandem with, and similar to, equipment 112 but provided with a slotted stator of the type illustrated in FIGS. 5 and 7 of Hager U.S. Pat. No. 3,194,540, with recycling from equipment 112A to the tank 110 and then by gravity head through equipments 112 and 112A, about a half dozen to a dozen times before delivery of the resulting product to the storage tank 113. During recycling, especially with sensitive emulsion prepared with a minimum of emulsifying agent, it is desirable to cool the emulsion which has been heated by working in the ultradispersing apparatus, by means of a heat exchanger in the recycle line, as at 112C.

As it further shown in FIG. 2, the presently most preferred arrangement for producing a cement of high polymer content without excessive recycling in the Mould's equipment 112-112B, employs a high pressure resiliently restricted orifice type homogenizer 113D, 113E as above described to which the emulsion effluent from the homogenizers 112-112B is fed after heating to temperature e.g. 140-160°F by the heat of 113A. The Gaulin type homogenizer comprises the pump 113D which is a plunger pump that develops from 1,000 to 10,000 p.s.i. depending on the resilient load applied to the valve head means resiliently restricting the emulsifying orifice or valve-opening means of the device. This load can be adjusted in the commercial devices by means of a hand wheel, shown at the entrance end of the homogenizer 113E. The output from the unit 113E may be delivered to cooler 113F and thence to storage 113, or may be delivered to storage tank 113G when recycled through the homogenizer circuit 113D-113F is desired.

Stripping Mixer—The stripping mixer 14 (FIG. 1) which disperse the aqueous emulsion of precursor latex sized solvent/polymer droplets into the gaseous stream of steam is preferably of the type illustrated in FIG. 4, consisting of a conduit section 114, which may be transparent, which has supported centrally thereof a torpedo shaped or fid-shaped member 114A for producing a restricted or venturi-effect passage 114B thereabout. The initial continuous phase of steam is admitted as at 114C to flow through the passage 114B and produce an area of high velocity and low static head thereat. The aqueous emulsion of solvent/polymer solution is introduced into the central body 114A as by way of the tube 114D upon which it is supported, and issues into the gas stream via a narrow slot 114E extending peripherally of the boby 114A at the region of greatest pressure reduction in the space 114B. The auxiliary flows of steam are introduced as above described, at 114F and 114G. The outlet of the section 114 connects to the vacuum equipment by way of the segregator and collector devices, as exemplified in FIGS. 3 and 5, and the vacuum in the chamber 114 is such that the temperatures attained do not exceed those at which the emulsion and latex are stable. The heat for vaporization of the solvent from the solvent/polymer solution is for the most part derived from the condensation of the steam, and the flowing stream of stream and organic vapor carrying the resulting suspended latex droplets is in the nature of an aerosol, exhibits no foaming in the tube 114, and does not coat or foul the tube 114. As is illustrated in FIG. 3, the aqueous emulsion of solvent/polymer solution is usually supplied to the mixer 114 under pressure, as by a pump 114H.

Elongated path progressive segregating means

The stripping operations of the process in certain embodiments thereof may be practiced with any suitable segregating means which provides an elongated path for turbulent or tortuous flow of the latex droplets constituting the discontinuous phase together with the vapor stream constituting the fluid driving continuous phase, with a decrease in pressure as the two phases progress along the path, the turbulance being such as to gradually coalesce the aerosol sized latex droplets into droplets of a size that can be separated from the gaseous stream carrying the same, while avoiding excessive foaming and while maintaining the temperature of the two phases within the limited range for stability of the oil-in-water emulsion concerned. While a number of types of apparatus are adaptable for the purposes, an effective and possibly the most compact arrangement is afforded by a heat exchanger of the corrugated plate type, arranged with the space between adjacent pairs of plates connected in series to afford the elongated tortuous path terminating in an evacuated separator or collector device. Such arrangement is illustrated as alternate in FIG. 3, wherein the aerosol like suspension from the mixer 114 is delivered through the plate type segregator 215 to the separator or collector 216, all under partial vacuum.

High-G latex droplet segreating means. An alternative and sometimes preferred form of segregating means is that illustrated at 115 in FIG. 3, and consists of a centrifugal pump having a pump rotor, pump chamber, and inlet and outlet means of the type shown in Freed et al, U.S. Pat. No. 3,324,798*. The two phases of the aerosol-like suspension of latex droplets in the solvent vapor stream are passed through the centrifugal pump 115, which delivers from an area of relatively high pressure to an area of relatively low pressure (adjustable by valve means 114H and 115A) and the latex droplets coalesce against the rotating and stationary surfaces of the pump and travel outwardly therealong, the inclination of the surfaces determining what part of the centrifugal force developed tends to move the coalescing latex latex along the pump walls and what part thereof tends to press the coalescing latex against the pump walls for aiding in preventing foaming.

Separating, condensing, and evacuating apparatus

As will be apparent to those skilled in the art the invention in its broader aspects is not dependent on the use of any particular type of separating, condensing and evacuating apparatus. Conveniently, when stripping azeotroping solvent, as a separator or colector 16 may be used a vertical cylindrical receiver, with a downwardly tapering bottom leading to a discharge opening connected to a positive displacement pump for removal of separated latex therefrom without breaking the vacuum, with a tangential side opening for passage of the two flows thereinto, and with a top opening for the discharge of the continuous phase to the condensing equipment. The latter conveniently may comprise two condensers, one for non-azeotroped water, and the other operating at a lower temperature for azeotrope of water and solvent. The evacuating apparatus conveniently may comprise a steam jet evacuation equipment connected to draw non-condensed material from the condenser equipment, or a vacuum pump.

In the form shown in FIGSS. 3, 4 and 6, the collector 216 generally resembles a cyclone collector into which the gaseous flow and any latex droplets carried thereby are discharged tangentially from the inlet 215H, and guided along the walls by appropriate internal baffling, e.g., the drop tube 216D, so that the liquid collects on the walls and flows to the bottom outlet 216C, while the gas passes to the top outlet by way of the passage afforded by the central drop tube, or equivalent baffling means, 216D to the condensor/vacuum system. Pump means 215E delivers the latex from the outlet 216C through the outlet valve 216B and, depending on pump and valve setting, wholly or partly via the recycle lines 216G, 216L. Valve 216M can be a pressure opened relief valve for maintaining a delivery pressure at the output of pump 216E while recycling all the latex not delivered by pump 324 or otherwise removed. As before mentioned, the walls of the collector 216 are preferably covered by a flow of latex from a distributor 216A, which provision facilitates the collection of the latex droplets delivered by the gas stream while minimizing foaming.

As is also shown in FIG. 3, the freshly stripped latex, preferably without removal of its residual solvent, is delivered by pump 324a via heat exchangers 325 and/or 325a and/or storage hold tank 324 to means for modifying the latex which may be used separately or in combination in the arrangement shown. The modifying homogenizer 326, as explained in connection with element 26, FIG. 1, effects the modifications of the latex there set forth, the concentrating circuit 1216-1220 corresponds with the concentrating circuit 31-32 of FIG. 1; and the modifying equipment 1224-1233 has been described above.

As specific illustration of the practice of the invention by the procedures above described reference may be had to the following examples which are illustrative, but not restrictive, of the invention.

EXAMPLE 1

Preparation of Butyl Rubber Latex.

The coarse emulsion for this example is formulated as follows:

To a sigma blade mixer is added 800 lbs. of butyl rubber and 3,600 lbs. of toluene. The mixer is run for twelve hours and a clear cement results. The temperature of this cement is raised to 160° F. and the cement is then mixed with 2,800 lbs. of water also heated to 160° F. and containing 48 lbs. of the sodium salt of nonylphenylether of polyoxyethylenesulfate containing about 4 ethylene oxide units.

The coarse emulsion at 160° F. obtained in the sigma blade mixer is then passed once through a homogenizing circuit comprising in series the two forms of disperser 112 and 112A described above in connection with FIG. 2, each operated at 5,200 rpm with the aid of a 15 horsepower motor. The resulting fine cement-in-water emulsion is then delivered to a heat exchanger 113A and therein cooled to 135° F. and then delivered once at a pump pressure of 4,000 p.s.i. developed by plunger pump 113D driven by 75 horsepower motor M through the constriction of a resiliently restricted orifice type industrial homogenizer (model K24-3BS manufactured by Manton-Gaulin Manufacturing Company, Inc.), from which the resulting aqueous emulsion of solvent/polymer solution is delivered to storage 113 after cooling to about 100° F. in heat exchanger 113F.

The fine cement-in-water emulsion is then injected as illustrated at 114E in FIG. 4, with a stream of steam 114C expanded down to a sub-atmospheric pressure measured as a vacuum in the range of 8 to 10 inches of mercury depending on the rate of feeding of the steam at 114C, the emulsion at 114E and additional steam introduced downstream of 114E, which in total were fed in the proportion of about three pounds of steam per 4 pounds of the toluene content of the cement, about one third of this steam being supplied at 114C and the remainder being supplied in about equal parts at 114F and 114G spaced one foot and two feet downstream from 114E, respectively. The output of the unit 114 after augmenting of the flow and solvent stripping at 114G is passed through a pressure gradient controlling means 114H which may be in the form of a pipe constriction, a valve, or an extended length of conduit, and thence to the segregator means (15, FIG. 1, 115 or 215, FIG. 3). The segregator 215 may be a corregated plate type heat exchanger as illustrated in the aforesaid copending application, no heat being supplied to the intervening spaces between the pairs of plates, but in accordance with the present improvement the segregator employed in this example is one in which the gas and liquid latex phases are both subjected to centrifugal force to effect the segregation or coalescence of the latex phase droplets, e.g., a centrifugal pump 115, wherein the two phases are subjected to a pressure drop because the outlet of the pump is connected to the vacuum separator 216 at the same time that centrifugal accleleration is being imparted to throw the latex particles together to form larger droplets. The pressure drop in the pump 115 is regulated by the means 114A and a similar pressure gradient controlling means 115A. The gaseous and liquid droplet phases which have been passed through the segregator 115 are delivered to a separator 216 connector through a condenser system to a source of vacuum of between 26 and 29 inches of mercury. The flow rates of the steam and of the aqueous emulsion of solvent/polymer solution are adjusted to attain as large a throughput as possible without detrimental foaming producing carryover from the separator, and the continuous vapor phase free of any foam is passed to the condensing equipment, where the water in excess of the quantity azeotroped with the solvent is condensed in a first stage, the remaining azeotrope being condensed in a second stage and separating into solvent and water layers immediately on condensing. The solvent is substantially all accounted for in the gaseous phase; the separated latex from this initial stripping operation containing about 18 percent solids, dry basis, and is useful as a dilute adhesive composition.

Example 2.

Modification of the stripped Residual Solvent Containing Latex.

To one-fourth of the stripped latex from Example 1, is added 2.0 lbs. of monosodium phosphate which reduces the pH to 5.5 and this acidic latex is fed at 3,000 p.s.i. to the orifice homogenizer 326 and thereafter fed to the concentrating circuit 12.20–12.16 whereby the latex solids are raised to 65%.

EXAMPLE 3

Polar Modification of the Stripped, Residual Solvent Containing Latex.

To one-fourth of the latex from Example 1, is added 20 lbs. of octylacrylate and 2.0 lbs. of cumene hydroperoxide, and 1.0 lb. of tetraethylenepentamine. After passing through the homogenizer 326 at room temperature the latex is subjected to polymerization by heating to 120°F. for 6 hours, and is then concentrated to a solids content of 62 percent in concentrating circuits 1216, 1220.

EXAMPLE 4

Polar Modification of the Stripped and Concentrated Latex with the Aid of a High Pressure Homogenizer.

One-fourth of the latex from Example 1 is concentrated to 62 percent solids by concentrating unit 1220 and 1216 with recycle.

To the concentrated latex is added 16 lbs. of dodecylacrylate, 4 llbs. ethyleneglycoldimethacrylate ester, 2 lbs. cumene hydroperoxide, and 1 lb. of tetraethylenepentamine, the cross-linking agent, monomers, and catalyst are obtained from recievers 1224a, 1224c and 1224b and the combination is mixed in the mixer 1224 and pumped at 4,000 p.s.i. through homogenizer 1226 then heated to polymerize the monomer material at 1225 then cooled with the aid of the heat exchanger 1232 and is sent to storage 1233.

EXAMPLE 5

Preparation of Polyisoprene Latex.

Polyisoprene rubber Goodyear Tire and Rubber Company's Natsyn type 200F is mixed in the laboratory Banbury for 4 1/2 minutes and dumped at a temperature of 360°F.

To a sigma bladed mixer is added 430 lbs. of the Banbury treated polyisoprene prepared similar to heretofor, 3470 lbs. of toluene and 26 lbs. of oleic acid and on mixing overnight a smooth cement results.

An aqueous alkaline solutiion is prepared by dissolving in 2270 lbs. of water, 17 lbs. of oleic acid and 6.6 lbs. of potassium hydroxide. The 3920 lbs. of polyisoprene cement containing 6 percent by weight oleic acid based on the rubber is mixed with the 2290 lbs. of alkaline soap solution. With very little agitation the mix becomes a fluid coarse emulsion.

The coarse emulsion is placed in a stainless steel tank with a bottom opening connected to a homogenizing apparatus 112 which is provided with a recycle line to said tank. The rough emulsion is pumped through the homogenizing apparatus 112 for a period of 1 hour and 30 minutes and the temperature rises from 30°C. to 65° microscopic observation of the resulting emulsion shows it to be of precursor latex particle size. The latex is then cooled and fed into a resiliently restricted orifice type homogenizer (113D–113E) at 5,000 p.s.i. and at a temperature of 40°C. and is stored (as at 113). At 40°C said latex is steam stripped in the apparatus 114–114G and thereafter segregated and collected (as at 216). To assure stability of the latex temperature are held at 60°–70° C during the stripping operation. The polyisoprene latex obtained from the stripping operation has about 20 percent solids and contains residual solvent.

EXAMPLE 6

Modification of Residual-Solvent Containing Polyisoprene Latex.

One-fourth of the latex prepared by Example 5 is concentrated in solids in the range of 40 percent and designated 6-A. Another fourth is passed through the Gaulin homogenizers at a pressure of 6,000 p.s.i. at 40°C. and this latex concentrated to a somewhat higher level of solids content and was designated 6B.

EXAMPLE 7

Preparation of polyisoprene Latex with Increased Molecular Weight.

To latex designated 6B from Example 6 is added 3 lbs of dicumylperoxide from 1223a and the mixture pumped at 4,000 p.s.i. through the homogenizer 1226 and then through the heater 1225 and then cooled in heat exchanger 1232 and sent to storage 1233.

EXAMPLE 8

By repeating Example 5, in the same equipment as employed in FIG. 3, but with a segregator such as the segregator 215 substituted for the segregator 115 of FIG. 3, similar results and economies are obtainable.

EXAMPLE 9

By repeating Example 5 in the same manner and in the same equipment except that when the raw emulsion steam aerosol is formed all of the steam is admitted at 114C.

EXAMPLE 10

Preparation of Ethylene-Propylene Rubber Latex.

To a sigma blade mixer is added 500 pounds of ethylene-propylene rubber (Enjay EPR rubber)* and 404 pounds of toluene, and after mixing 12 hours a clear rubber cement is obtained. A coarse emulsion is made by combining 4,540 pounds of this cement with an aqueous solution comprising 2,260 lbs. of water and 8.4 lbs. of 36 Percent hydrochloric acid and 50 lbs. of 50 Percent active quaternary ammonium compound sold under the trade name Redicote E-11 and consisting principally of the compound having the following formula:

$C_{18}H_{37}N(CH_3)_2cl\ C_3H_6N(CH_3)_3C1$ and to 10 lbs. of a fatty acid diamine sold under the trade name Duomeem C which consists principally of the compound having the following formula:

$C_{12}H_{25}NHC_3H_6NH_2$.

is added 8.3 lbs. of 36 percent hydrochloric acid dissolved in 100 lbs. of water. The temperatuure of the ethylene-propylene-toluene cement and the aqueous emulsion solution is maintained at 150°F. while mixing to form the coarse emulsion in the mixer 110.

The coarse emulsion at 160°F. obtained in the mixer 110 was then passed six times through the homogenizing apparatus 112. The homogenizer 112 is fitted with the stator and rotor which is run at 5,200 rpm with the aid of a 15 horsepower motor to form a fine emulsion. The fine emulsion from the honogenizer 112 is fed at 135°F. to the restricted orifice type homogenizer at 3,000 p.s.i. The homogenized latex is cooled in heat exchanger 327 to about 100°F. The latex is pumped with pump 114H to the mixer 114 and mixed with about three pounds of steam per four pounds of toluene present in the fine emulsion to form an aerosol.

The steam is added in about equal amounts through inlets 114C, 114F and 114G FIGS. 3 and 4.

The pressure in the mixer is held at 10 inches Hg with aid of valve 114A. The aerosol of latex particles and solvent vapor and water vapor is separated with the aid of the centifugal pump 115 functioning as a segregator. The residence time of the latex and vapor is controlled by the raw emulsion feed pump 114H and by valve 115A which adjust both the degree of partial vacuum and the extent of recycle in the centrifugal pump 115. From the segregator 115 the latex droplets and solvent vapor and water vapor is separated in the stripping unit set forth in FIG. 3 and comprising separator 216 pump 216E, squeeze valve 216M heat exchanger 220, product pump 324*a*. The separator operates under 26–28 inches Hg of vacuum removing the vapor 216D and the product at 216 C.

The stripped latex as cooled to 90°F. by cooler 325 and delivered to storage 324. From storage the latex is pumped to the homogenizer 326 operating at 3,000 p.s.i. and thence to storage.

The stripped latex from storage is pumped to the latex concentrating unit comprising the heat exchanger 1220 the vacuum separator 1216 the circulating pump 1216E the squeeze valve and the recycle lines as shown in FIG. 3 and the concentrated latex is pumped through heat exchanger 1232 to storage 1233.

EXAMPLE 11

By repeating Example 10 in the same manner and in the same equipment except that the raw emulsion is prepared by passing the crude emulsion six times through the shear pump 112 and then sent directly to storage by passing homogenizer 113D.

EXAMPLE 12

By repeating Example 10 in the same manner and in the same equipment except that the stripped latex from separator 216C is pumped by pumpe 324*a* directly to the concentrators 1220 and 1216 and is concentrated to high solids latex.

The examples set forth in the aforesaid copending applications, herein incorporated by reference, can also be performed with the apparatus herein disclosed, with valve adjustments and recycles arranged to conform to said examples.

While there have been described herein what are at prpeentt considered preferred embodiments of the invention, it twill be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A method of preparing a latex from an aqueous emulsion of solvent/polymer solution of precursor latex particle size, the solvent of the polymer solution being an organic solvent for the polymer and itself or as an azeotrope with water having a boiling point below that of water at atmospheric pressure, the polymer being essentially organic solvent soluble or dispersible and essentially water insoluble, and said emulsion having been prepared with the aid of an emulsifying agent, which method consists essentially of:

a. converting said emulsion to an aerosol of latex phase in an aqueous and solvent vapor phase by dispersing said emulsion into a flow of gas consisting essentially of steam at a temperature sufficiently high to vaporise solvent from said emulsion and not so high as to be detrimental to the stability of the emulsion and sufficient in quantity to vaporize essentially all of the solvent from said emulsion into said vapor phase, b. effecting separation of the latex phase and the vapor phase from step (a) in a vacuum separator, c. adding to the latex phase from step (b) monomer material containing and polymerizable through at least one ethylenically unsaturated group, in the amount of 0.1 to 100 parts by weight per 100 parts by weight of the polymer content of the latex phase, and selected from the class consisting of i. the mono-ethylenically unsaturated aromatic hydrocarbon monomers containing from 8 to 18 carbon atoms, ii. the conjugated diene hydrocarbon monomers containing not more than 12 carbon atoms, iii. the non-conjugated diene hydrocarbon monomers containing not more that 18 carbon atoms.

iv. the mono-ethylenically unsaturated monomers containing polar groups and having not more than 18 carbon atoms, and v. the non-conjugated diene and triene monomers containing polar groups and having not more than 22 carbon atoms, the polar groups of (iv) and (v) being selected from the class consisting of carboxyl, hydroxyl, carbonyl, ester, ether, nitrile, amine, quaternary ammonium, amide, triazine, and halogen groups, d. adding to the latex phase polymerization catalyst of the free radical generating type in the range of from 0.8 to 20 parts per 100 parts of the added monomer material be weight, e. flowing the latex phase containing the monomer material and catalyst through a constriction at a pressure in the range of 1,000 to 10.000 p.s.i., and f. subjecting the latex phase containing the added monomer material and catalyst to a temperature below the maximum temperature for stability of the latex but sufficiently high to polymerize the monomer material.

2. Method as claimed in claim 1, in which in step (e) there is added from 0.1 to 20 parts by weight per 100 parts polymer content of the latex of cross-linking monomer material selected from the sub-class consisting of groups (iii) and (v).

3. Method as claimed in claim 1, in which in step (e) there is added from 0.1 to 20 parts by weight per 100 parts polymer contents of the latex, of monomer material selected from the sub-class consisting of the hydroxyl and the carboxyl containing monomers of groups (iv) and (v).

* * * * *